Oct. 26, 1965    H. J. CHALL ETAL    3,214,097
MULTIPLICATION CONTROL FOR CALCULATING MACHINE
Original Filed Nov. 27, 1961    23 Sheets-Sheet 1
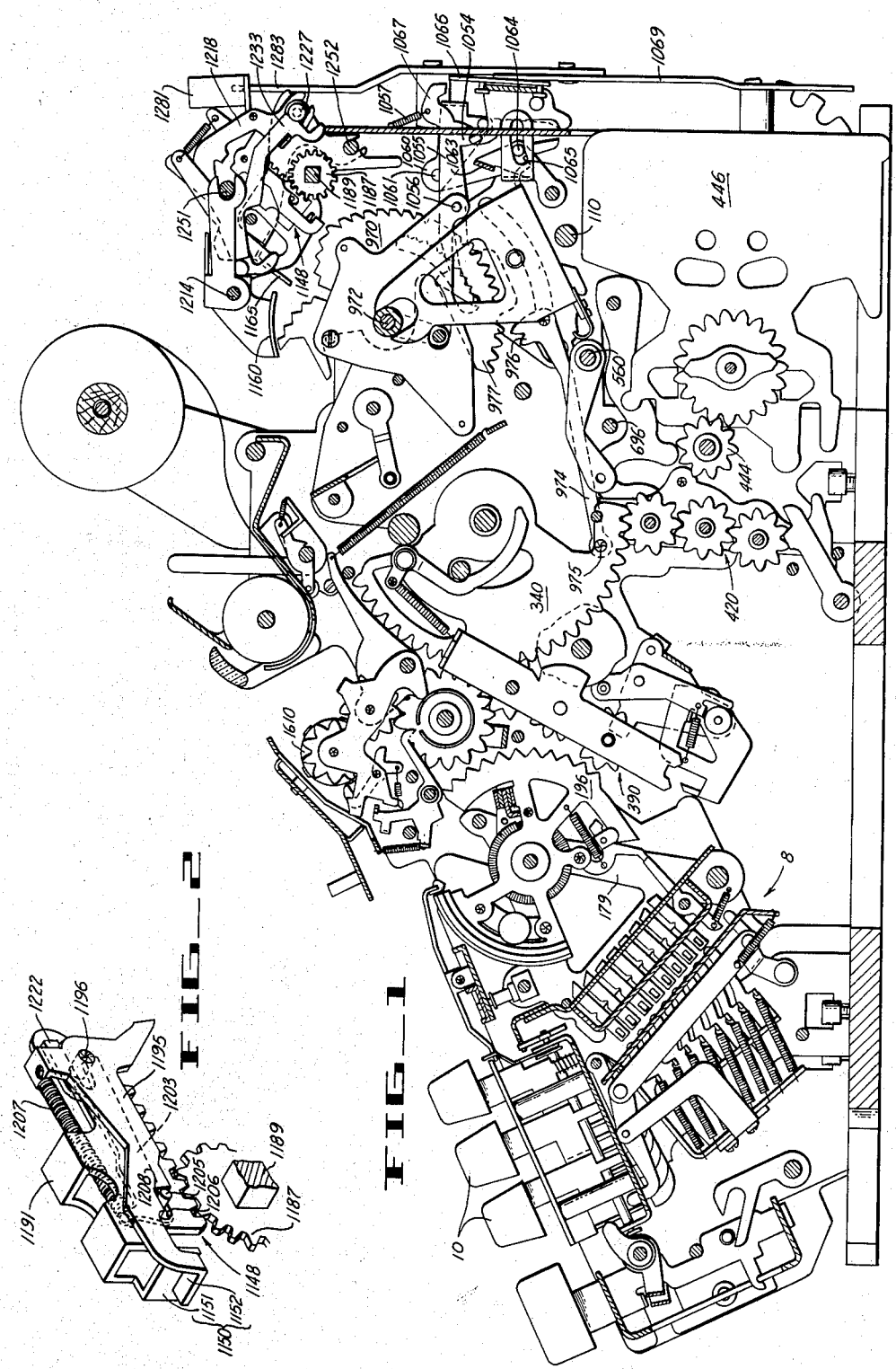

Oct. 26, 1965  H. J. CHALL ETAL  3,214,097
MULTIPLICATION CONTROL FOR CALCULATING MACHINE
Original Filed Nov. 27, 1961  23 Sheets-Sheet 2
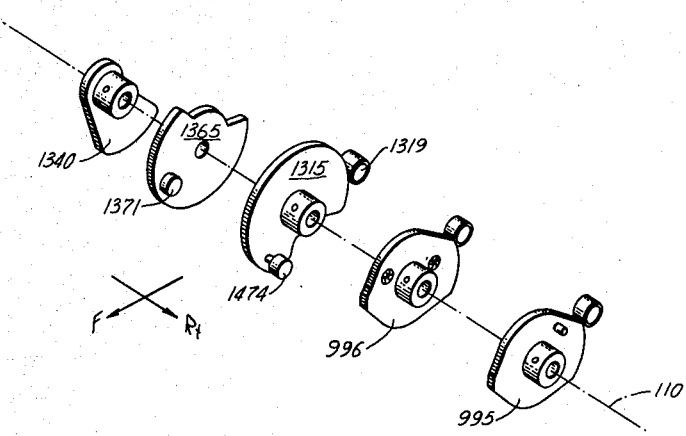
FIG_3
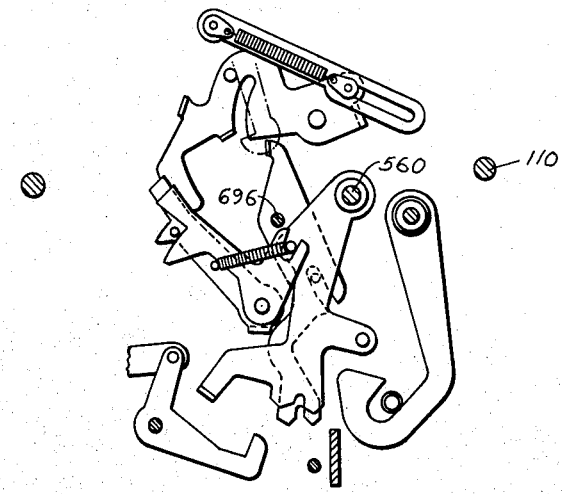
FIG_4

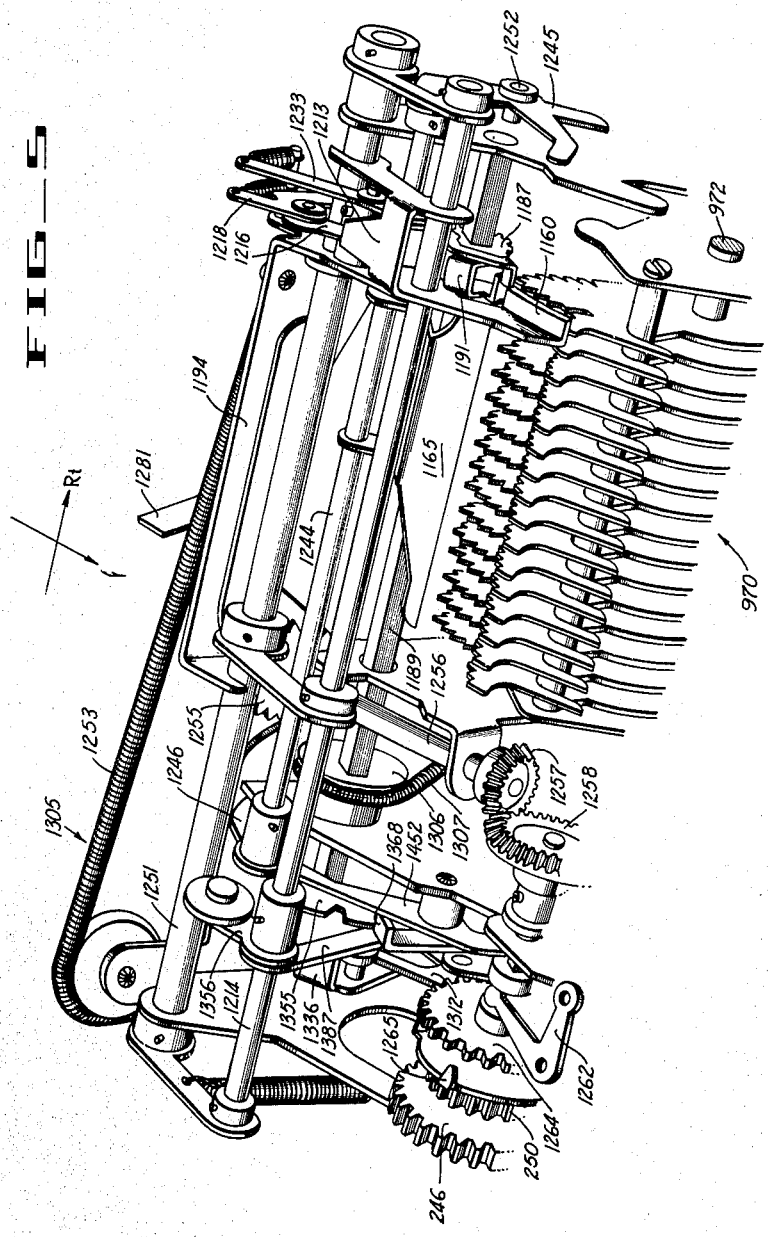

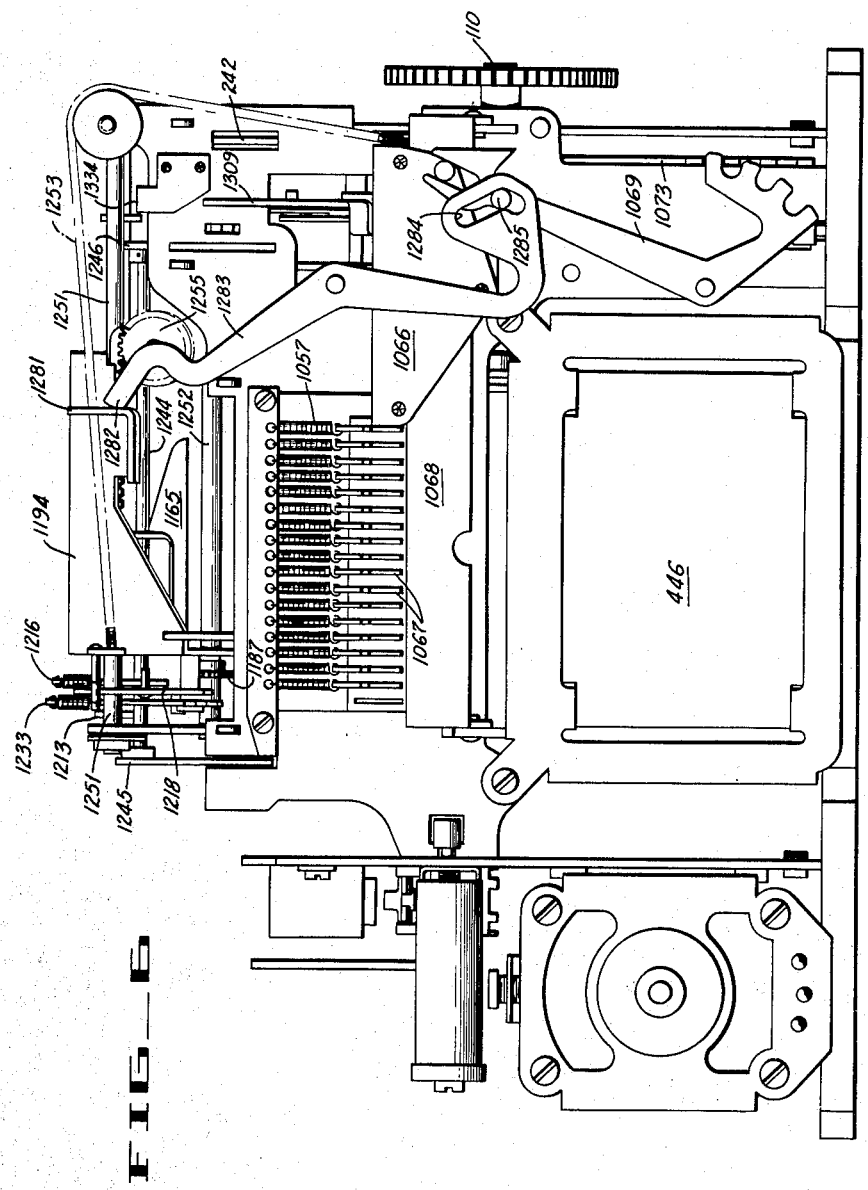

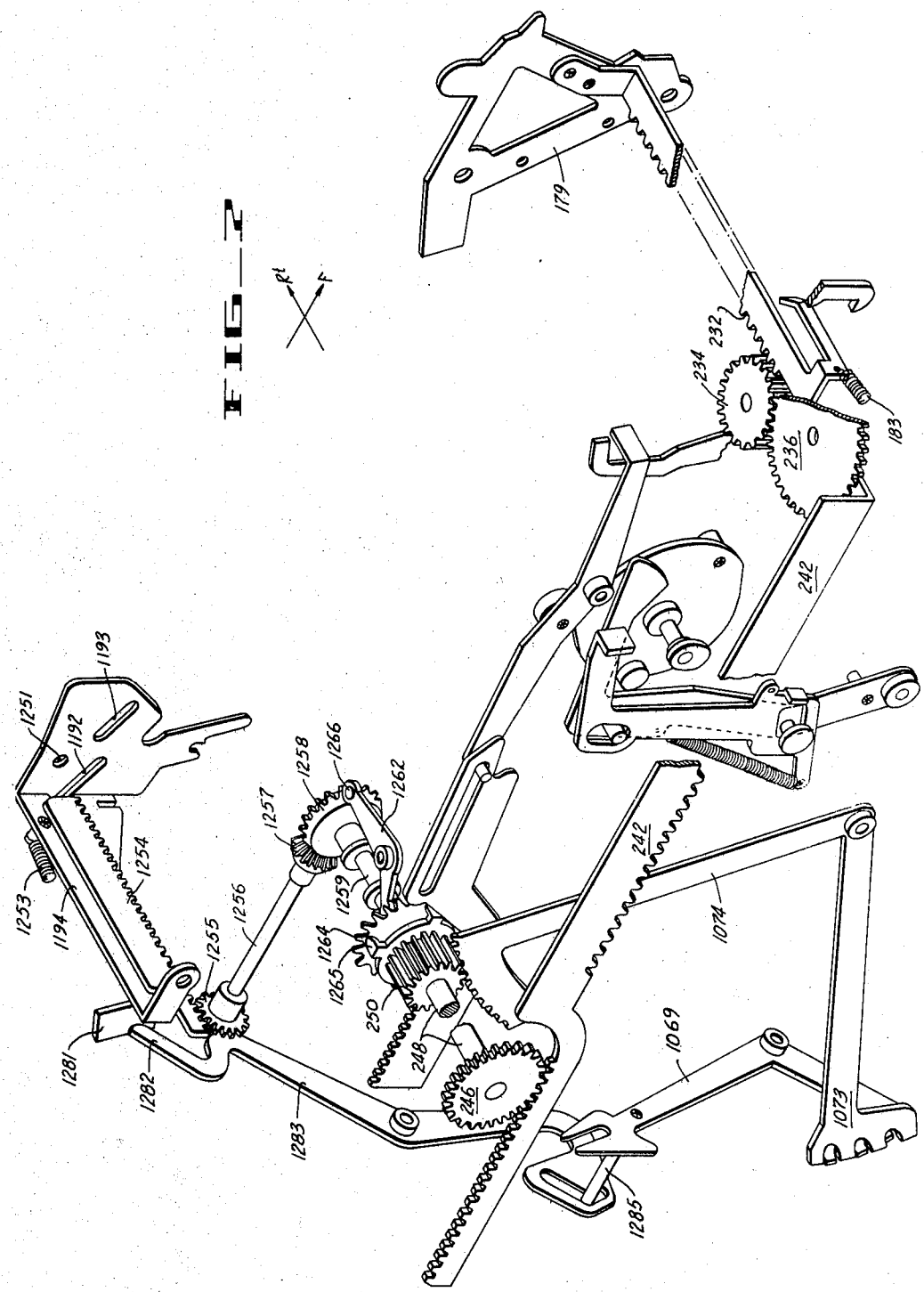

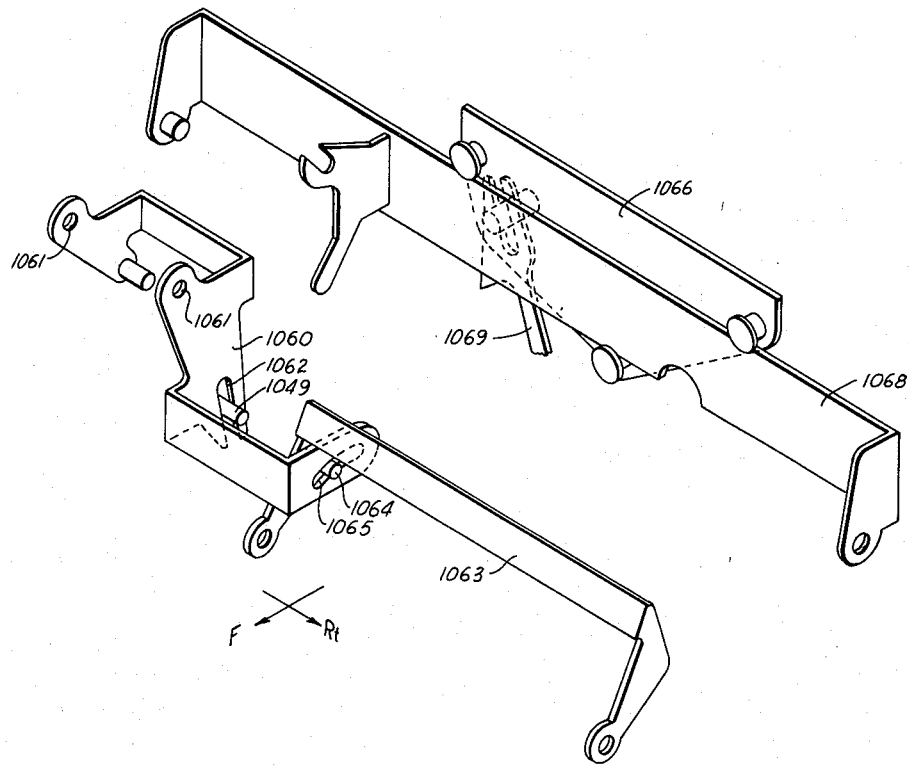
FIG_8
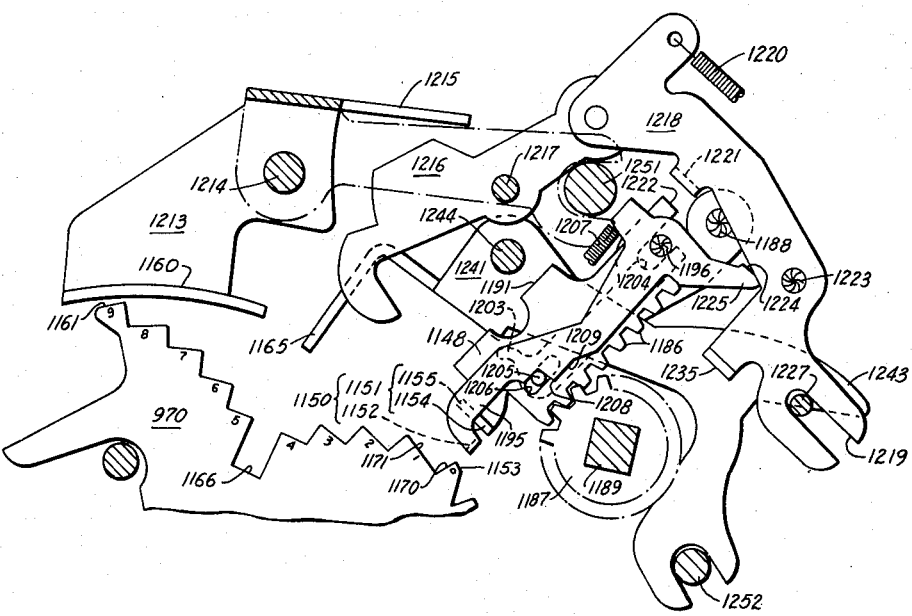
FIG_9

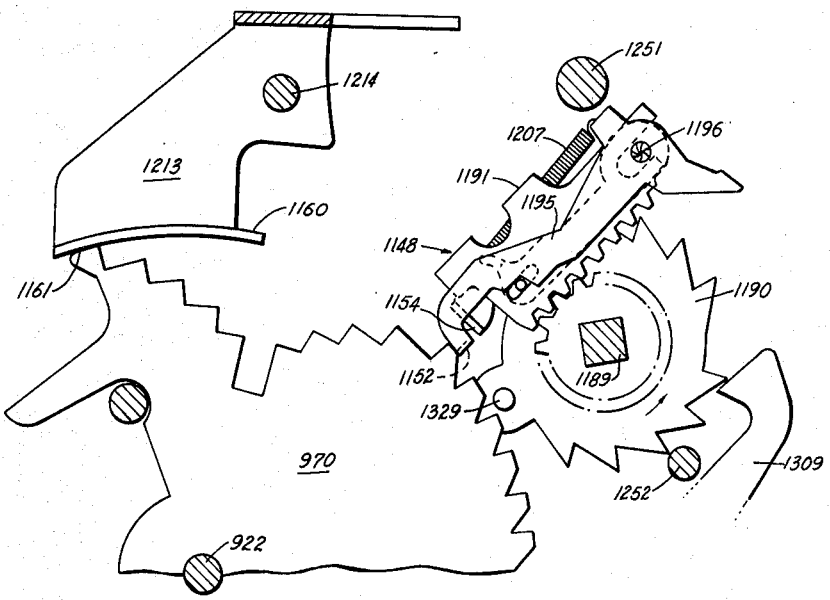
FIG_10
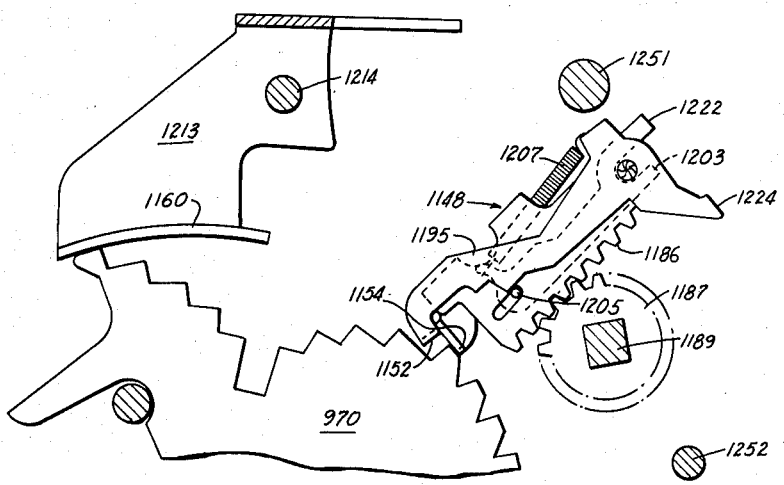
FIG_11

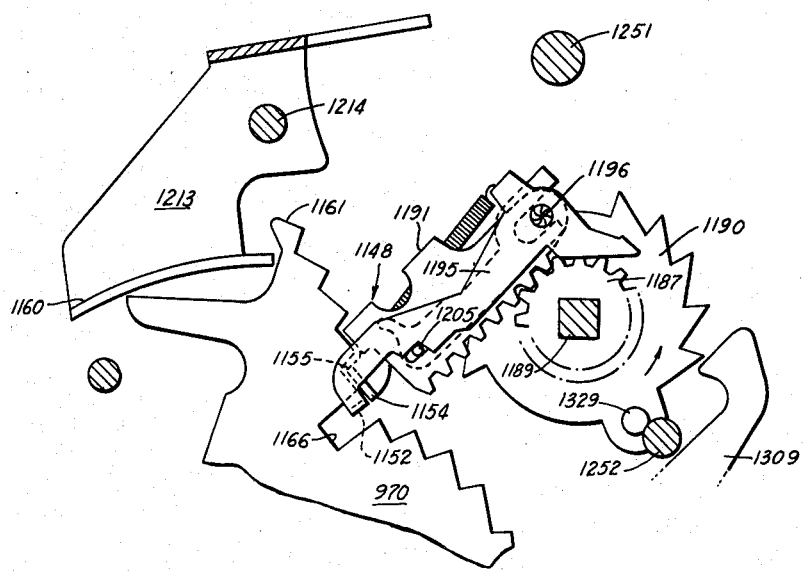
FIG_12
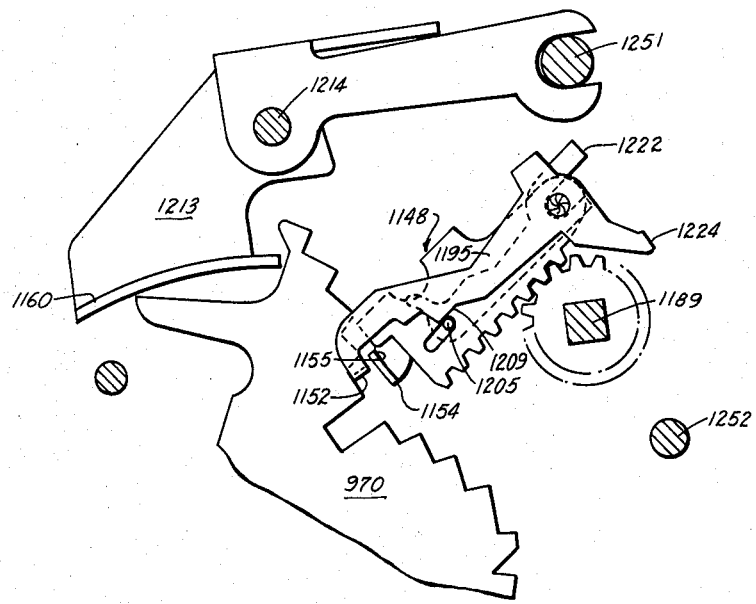
FIG_13

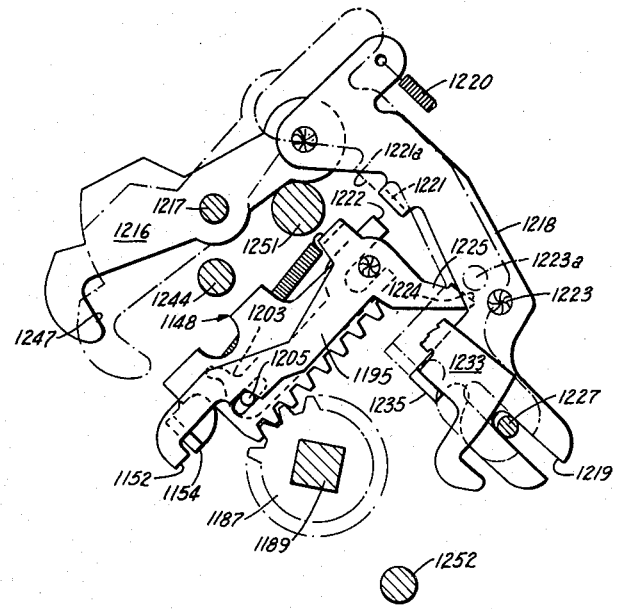
FIG_14
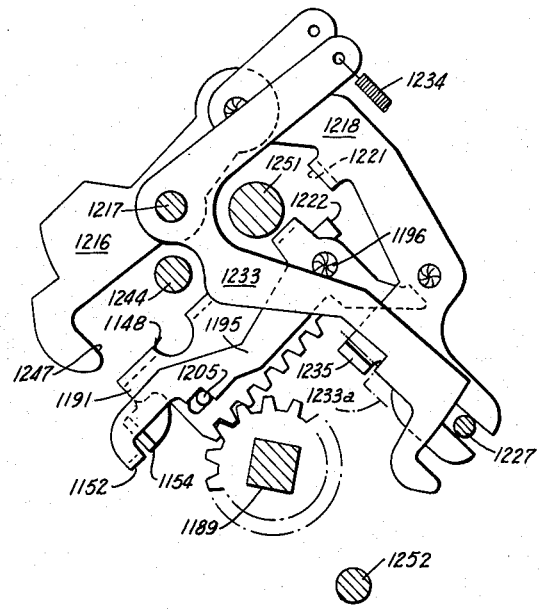
FIG_15

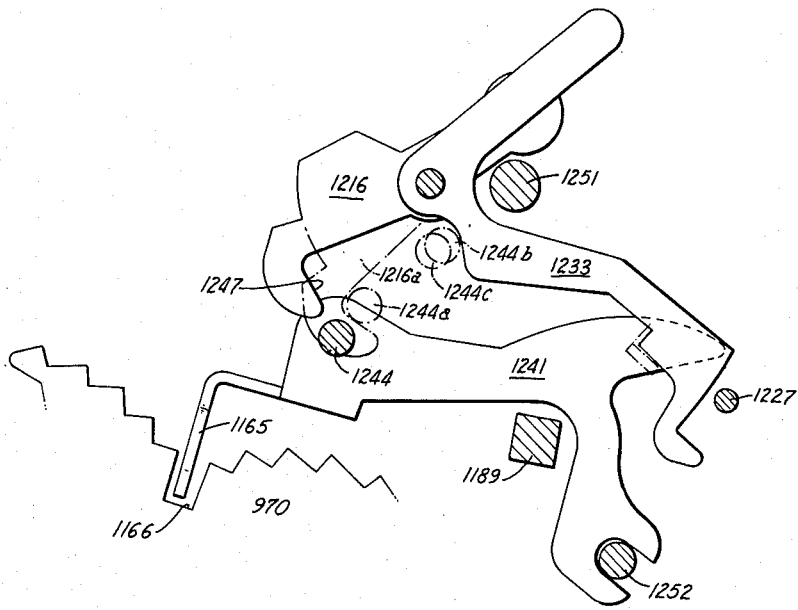
FIG_12
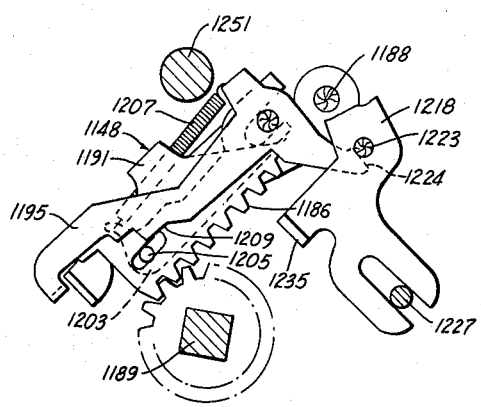
FIG_16

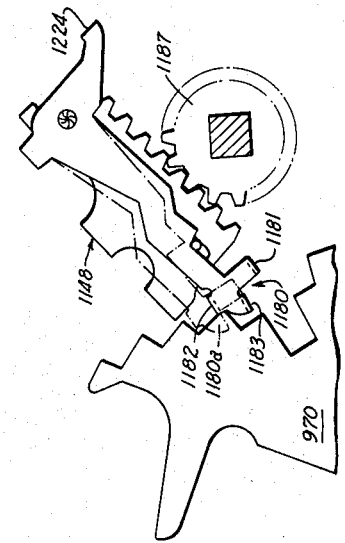
FIG_20
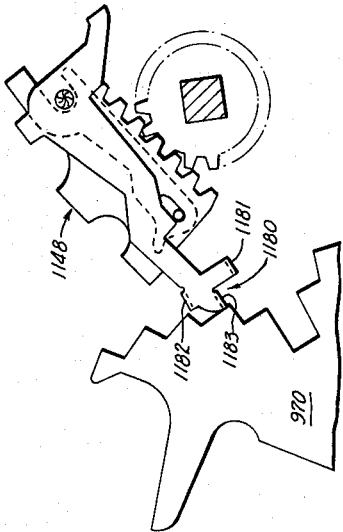
FIG_21
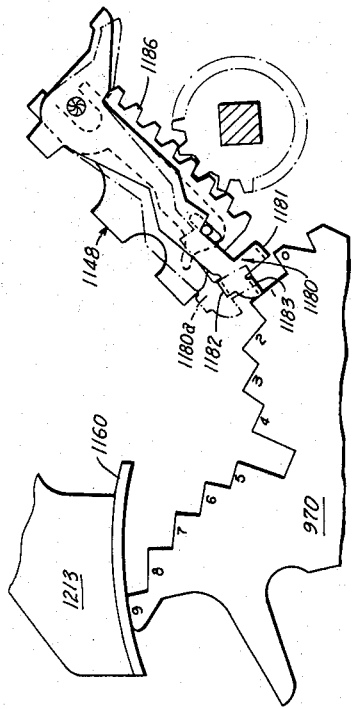
FIG_18
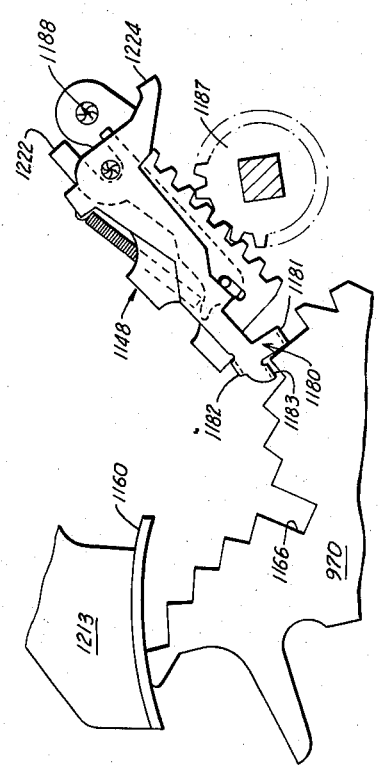
FIG_19

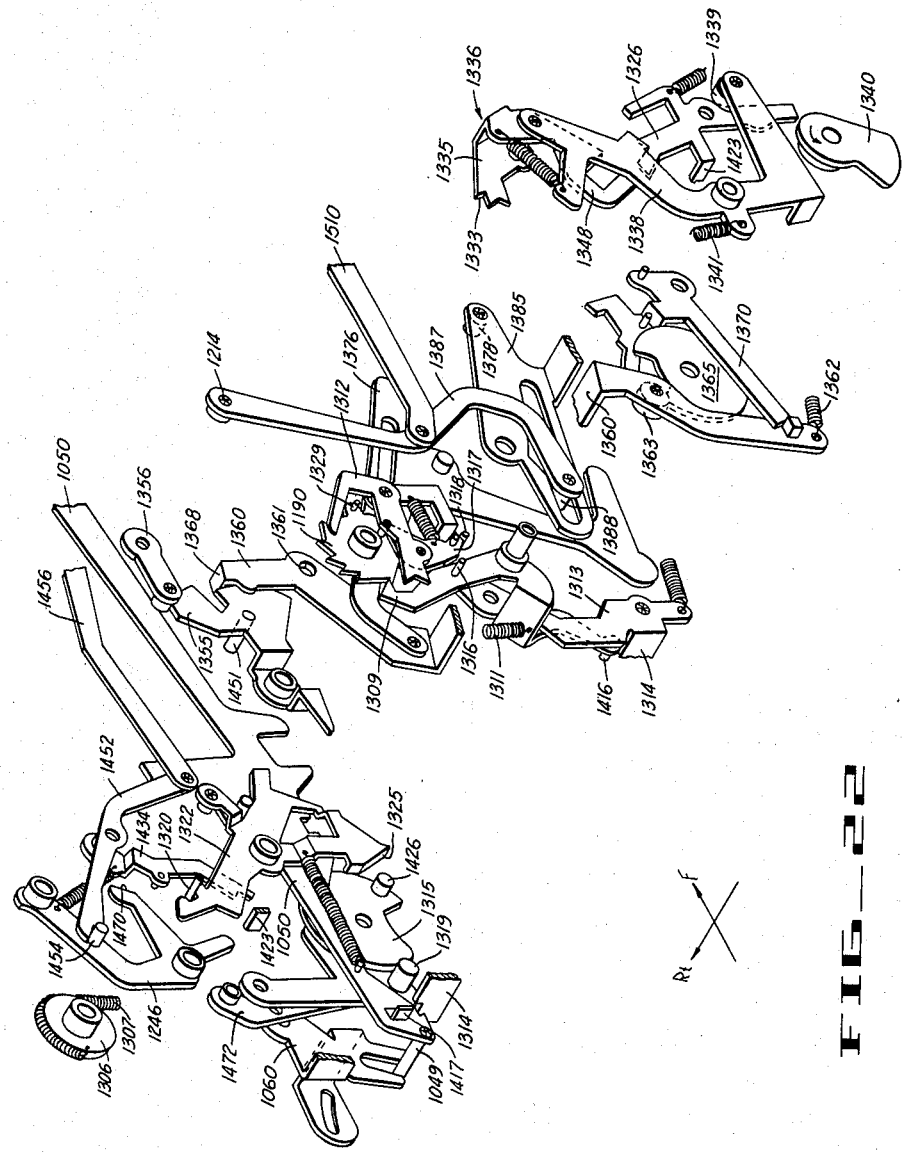
FIG_22

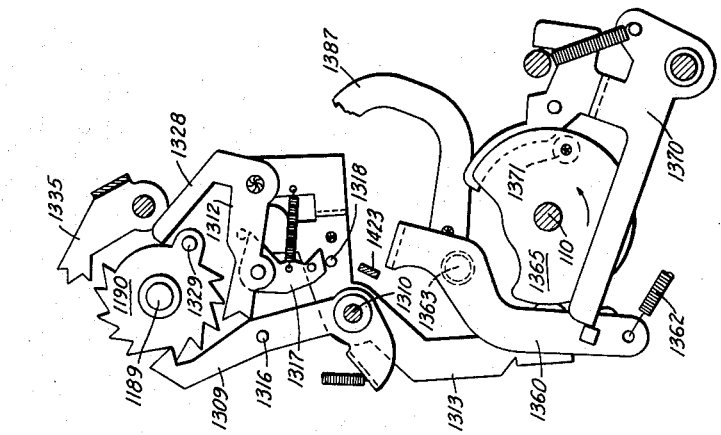
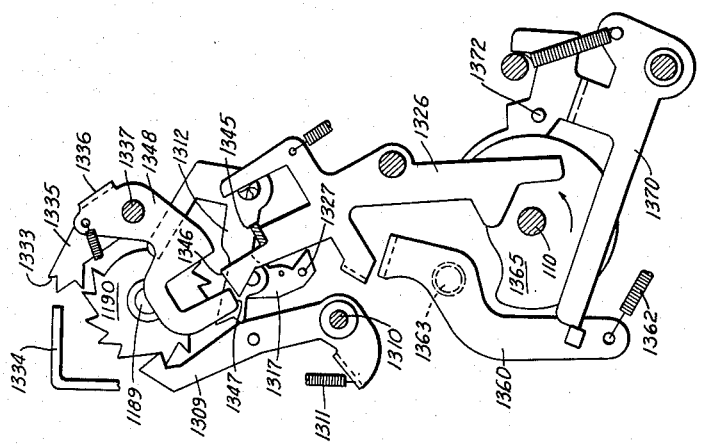
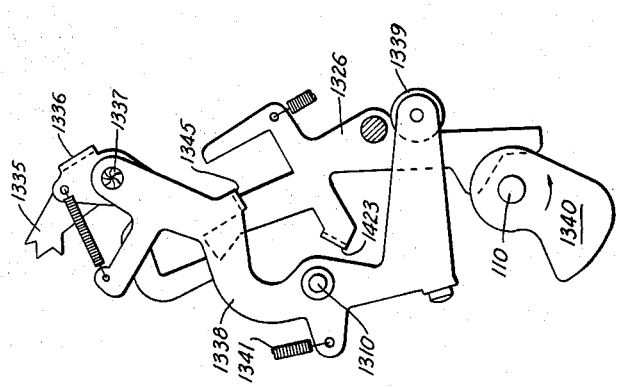

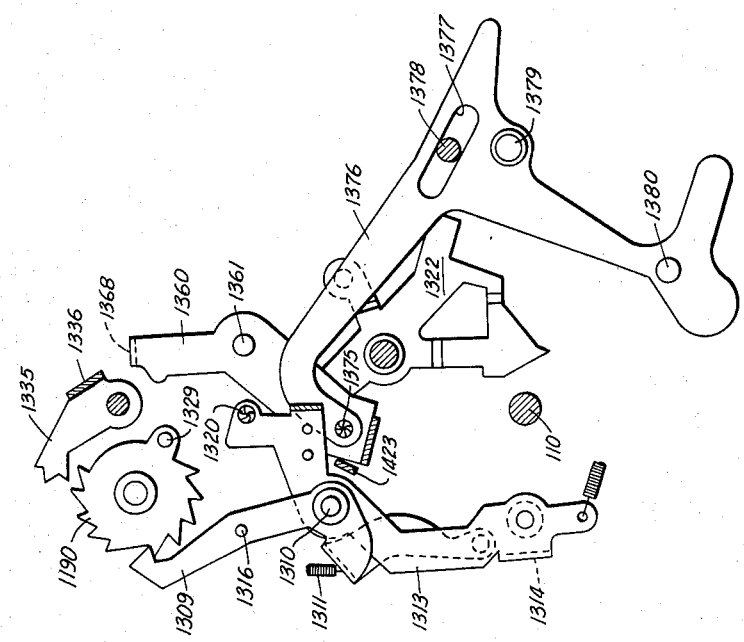
FIG_27
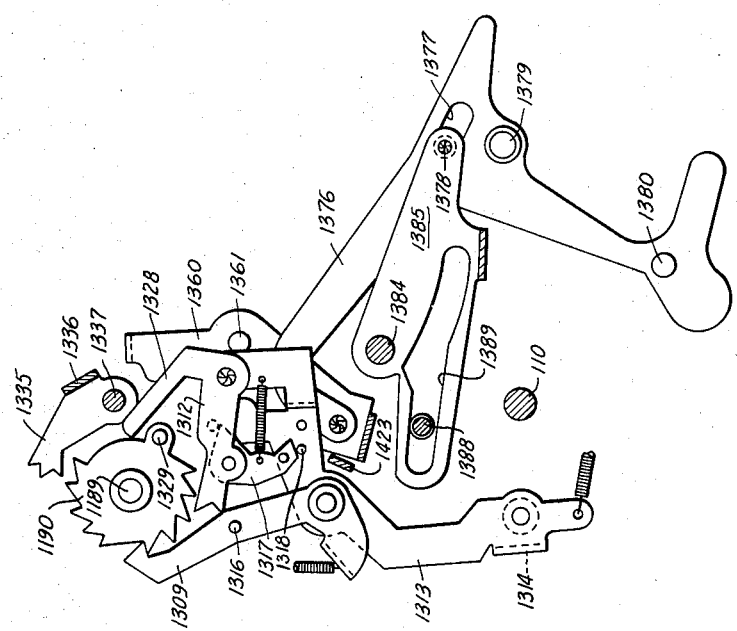
FIG_26

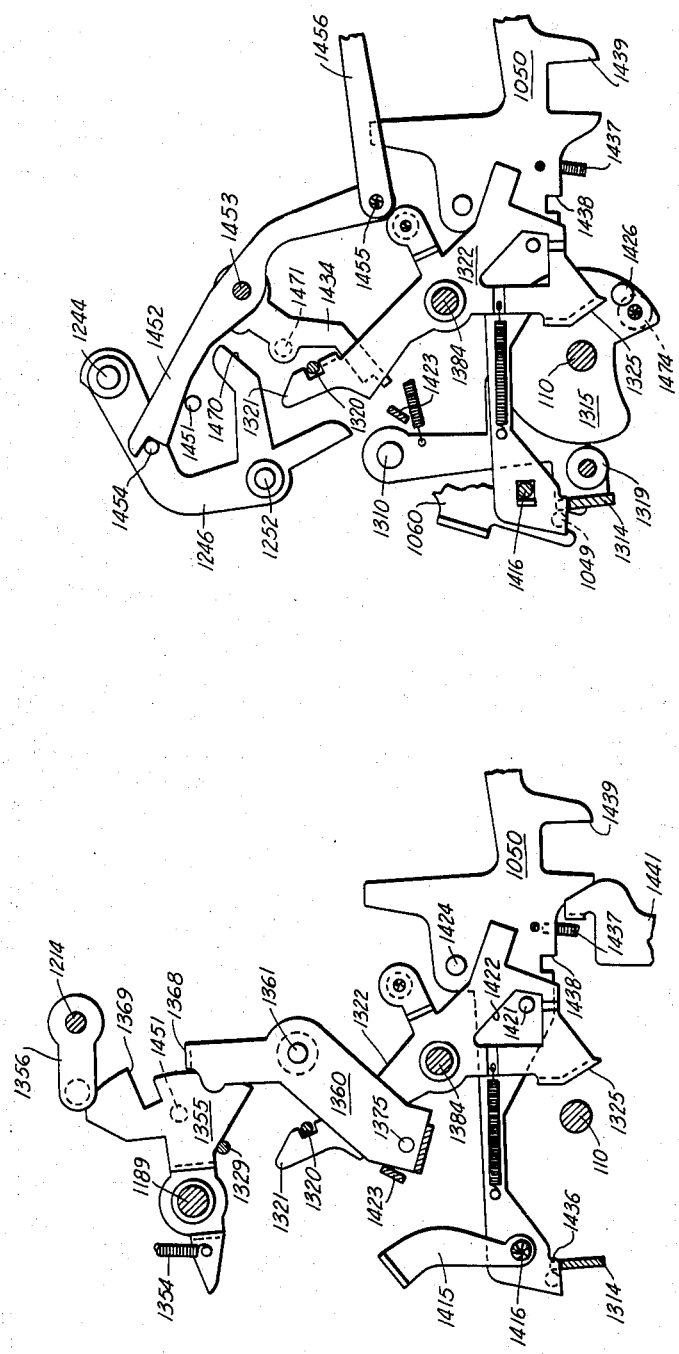

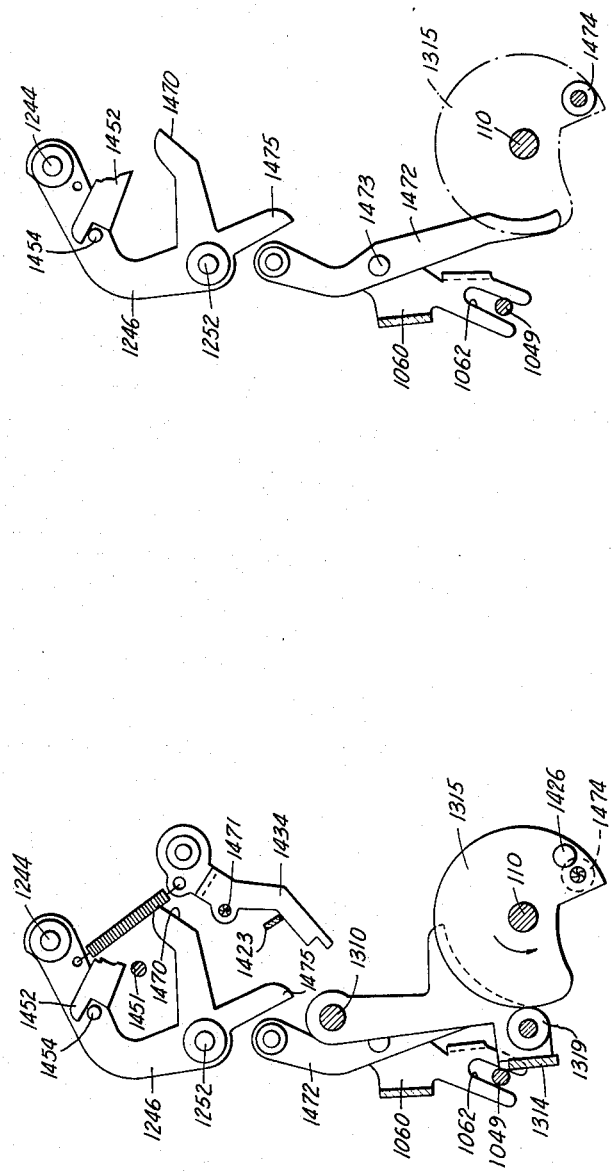

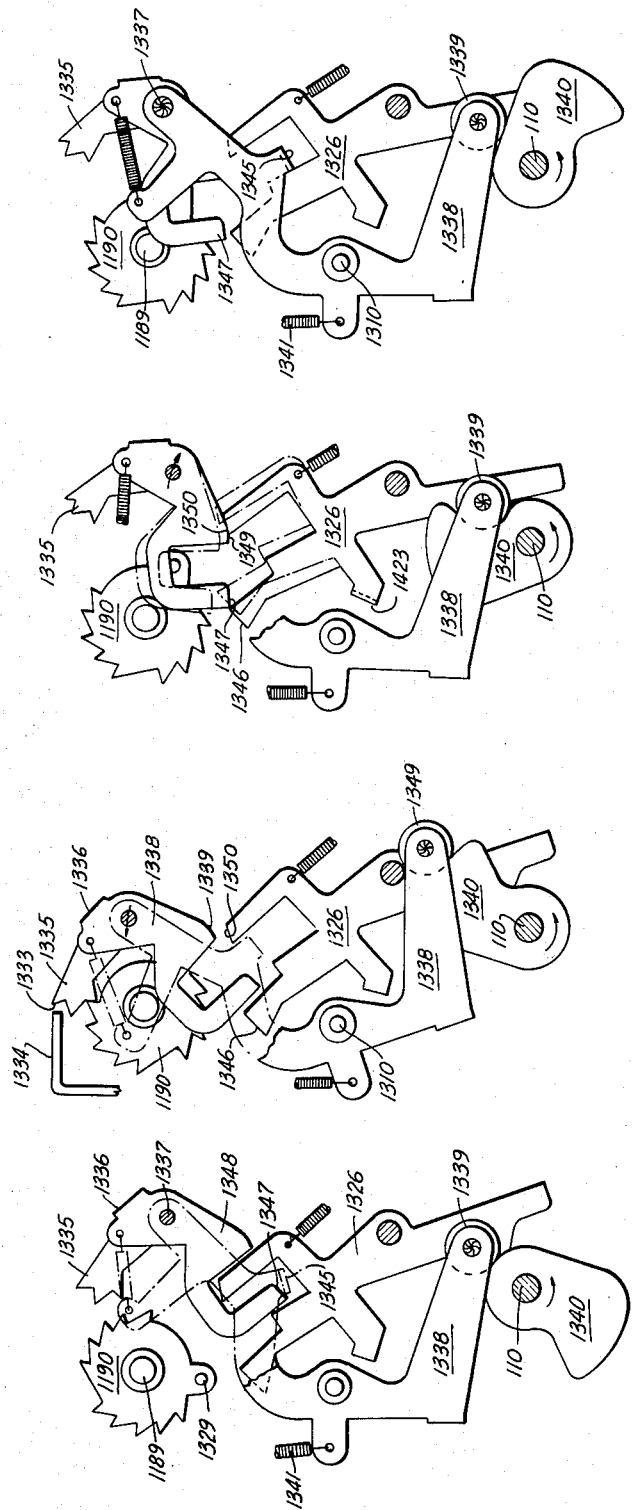

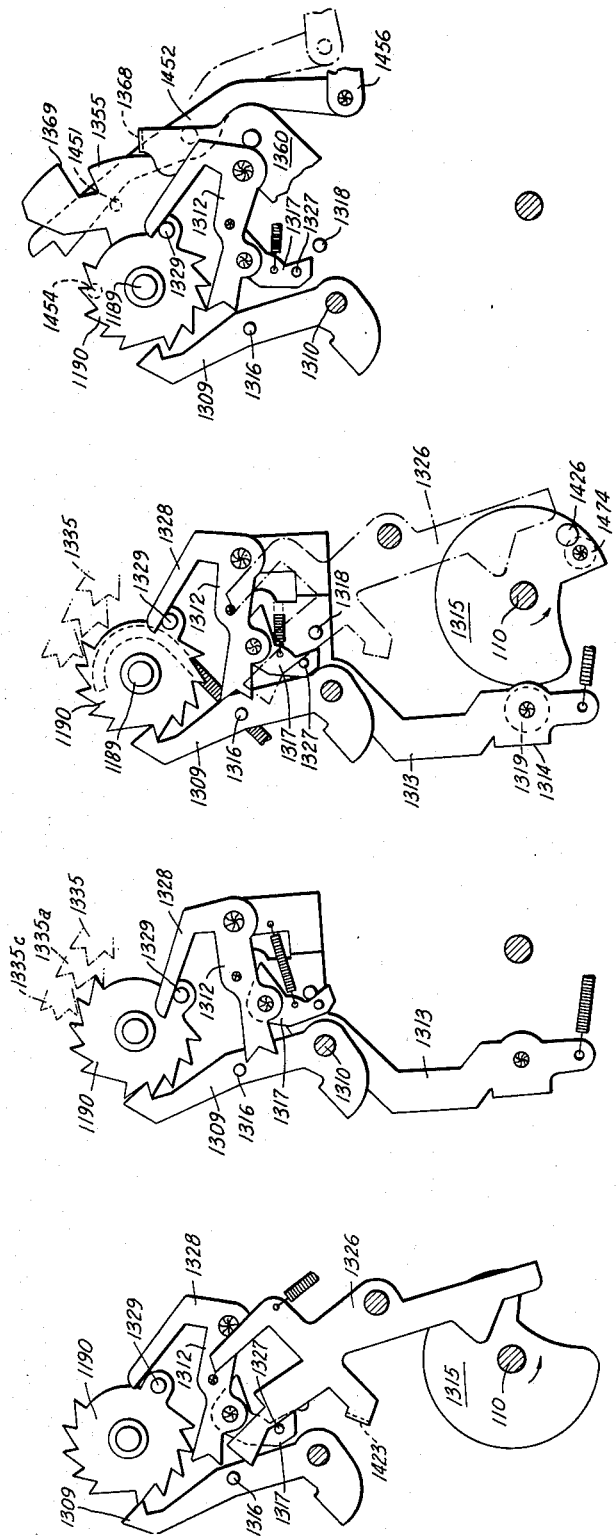

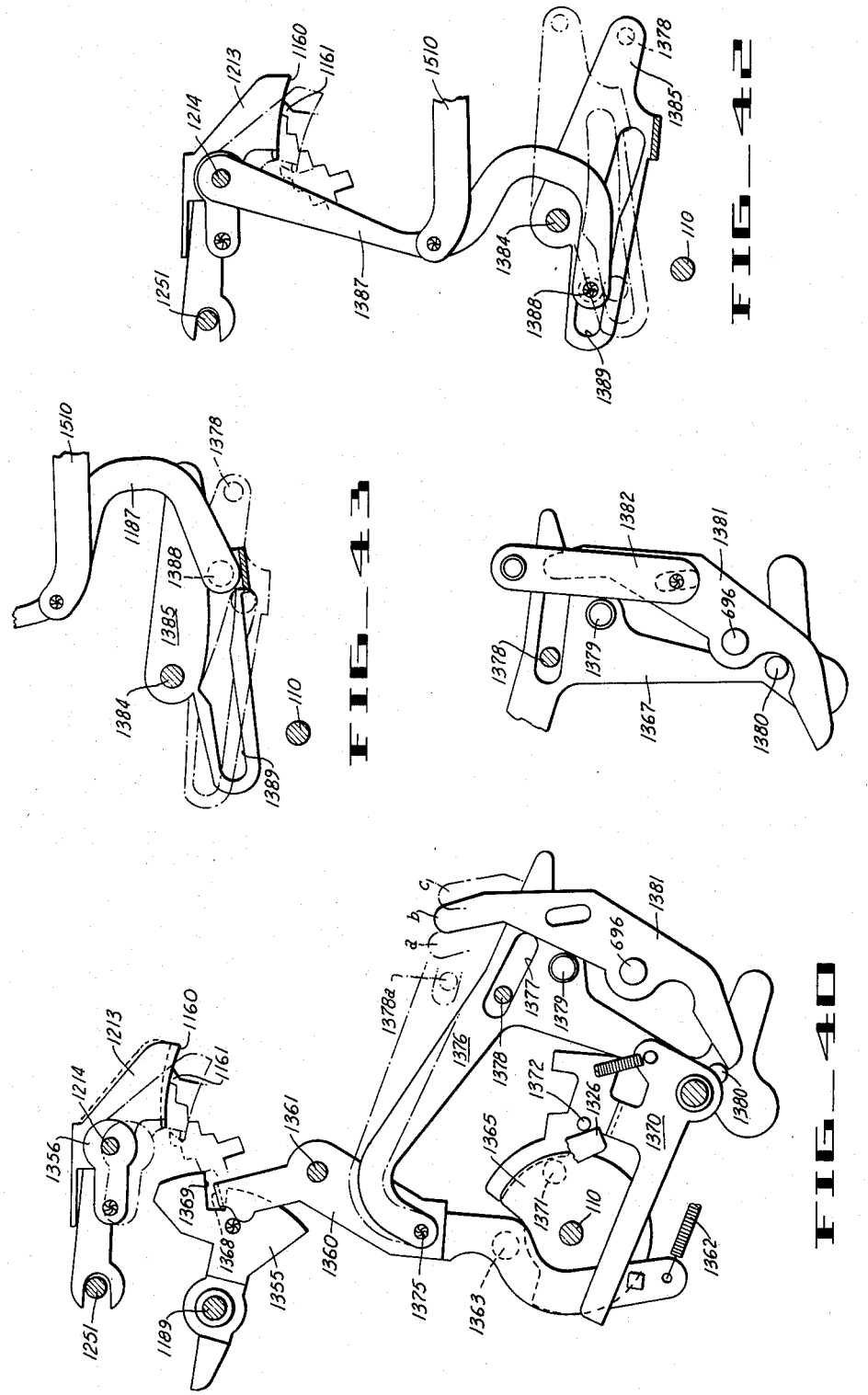

Oct. 26, 1965  H. J. CHALL ETAL  3,214,097
MULTIPLICATION CONTROL FOR CALCULATING MACHINE
Original Filed Nov. 27, 1961  23 Sheets-Sheet 20
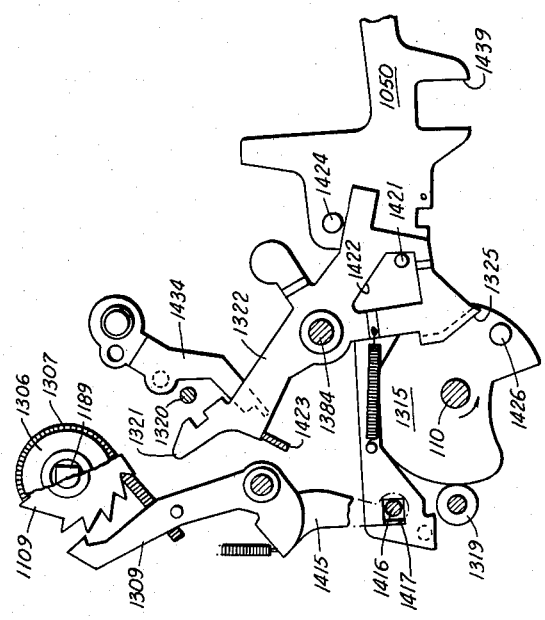
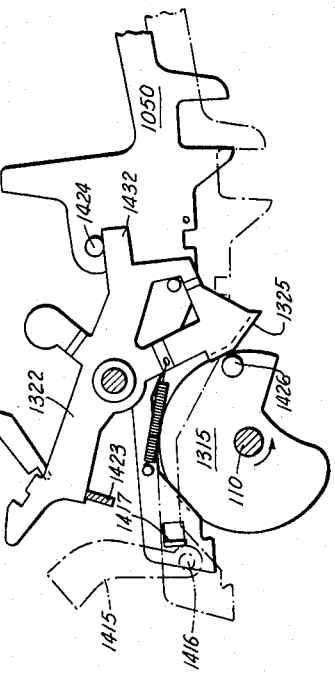
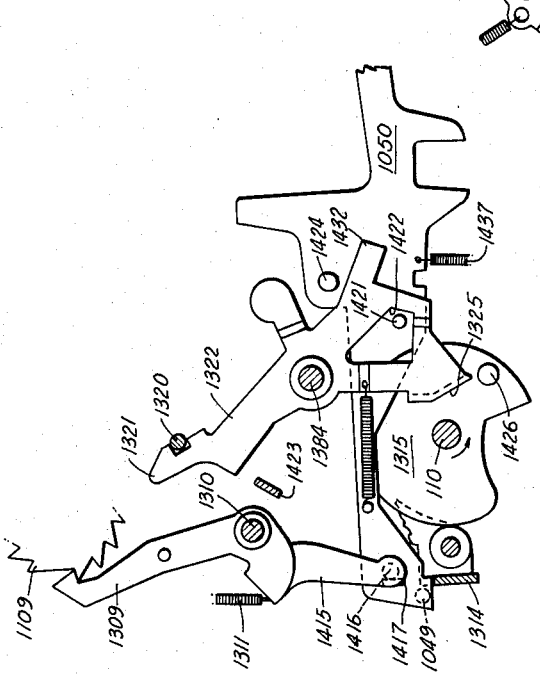

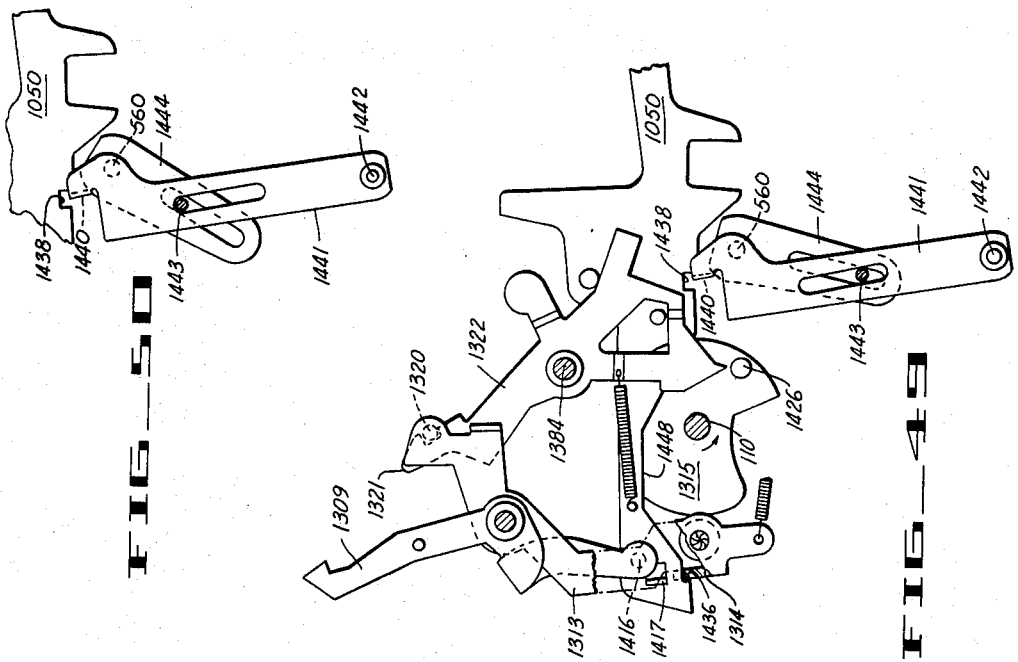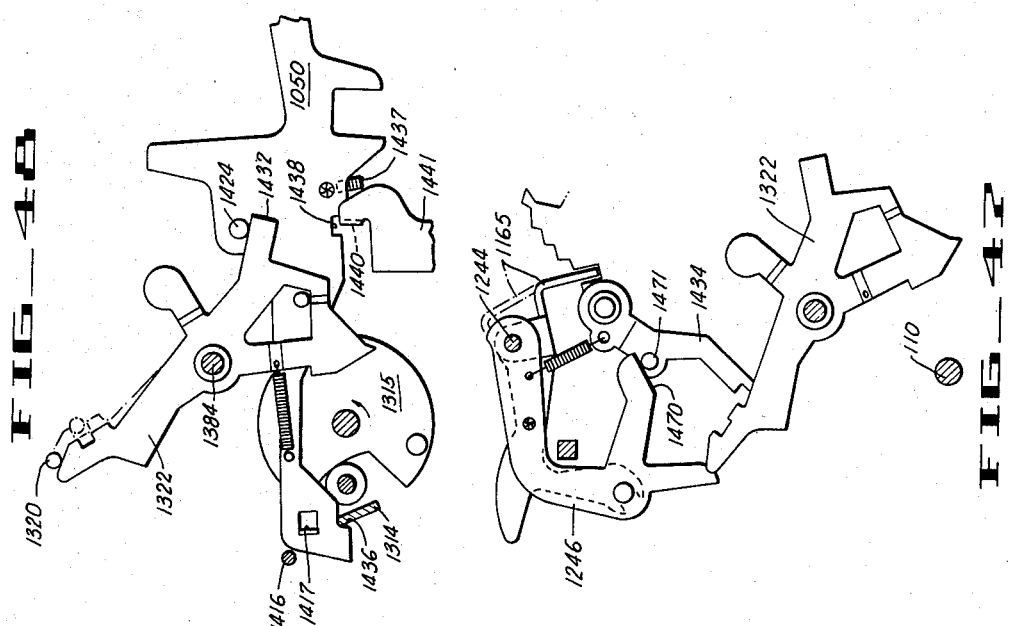

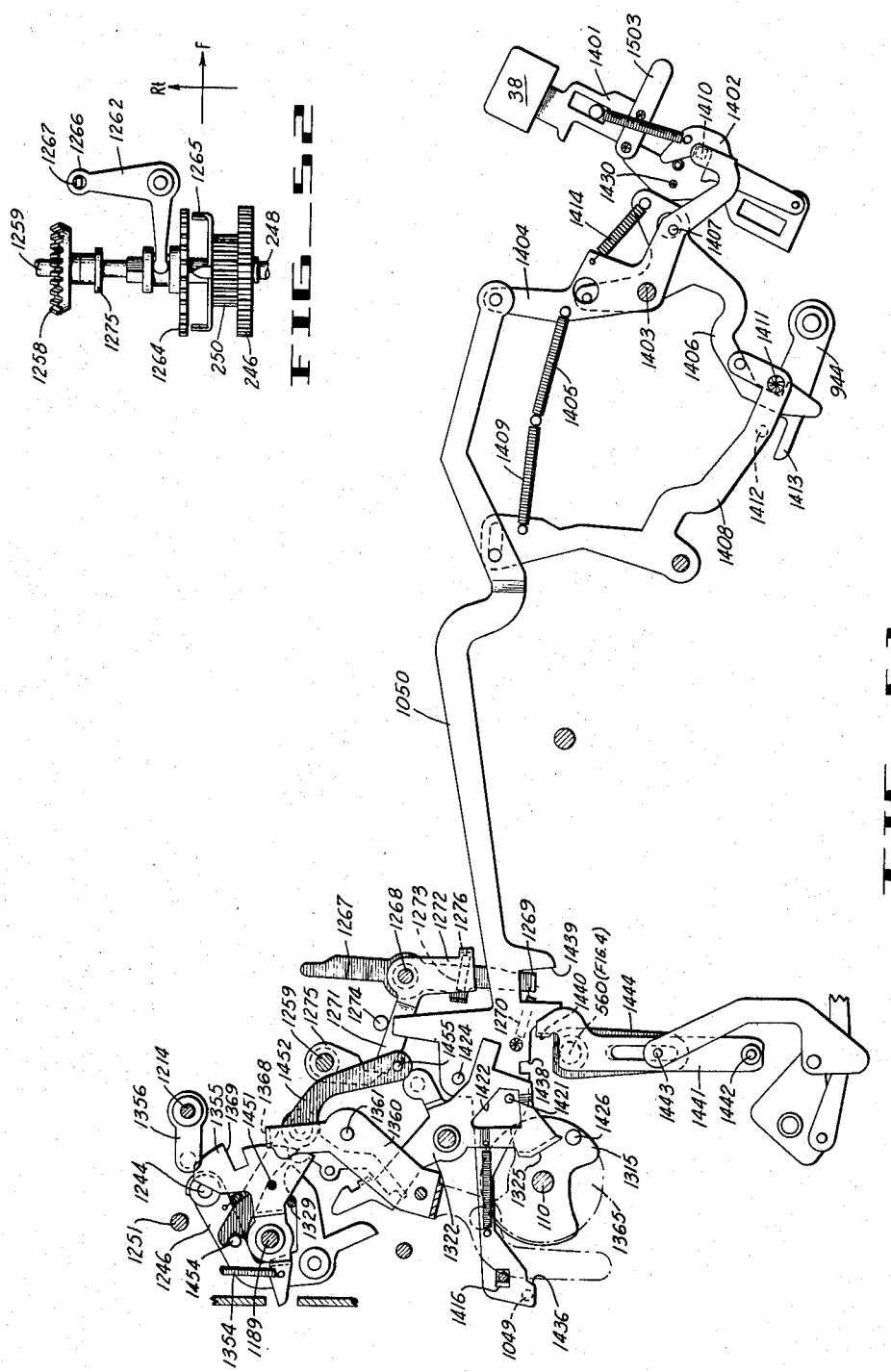

Oct. 26, 1965   H. J. CHALL ETAL   3,214,097
MULTIPLICATION CONTROL FOR CALCULATING MACHINE
Original Filed Nov. 27, 1961   23 Sheets-Sheet 23
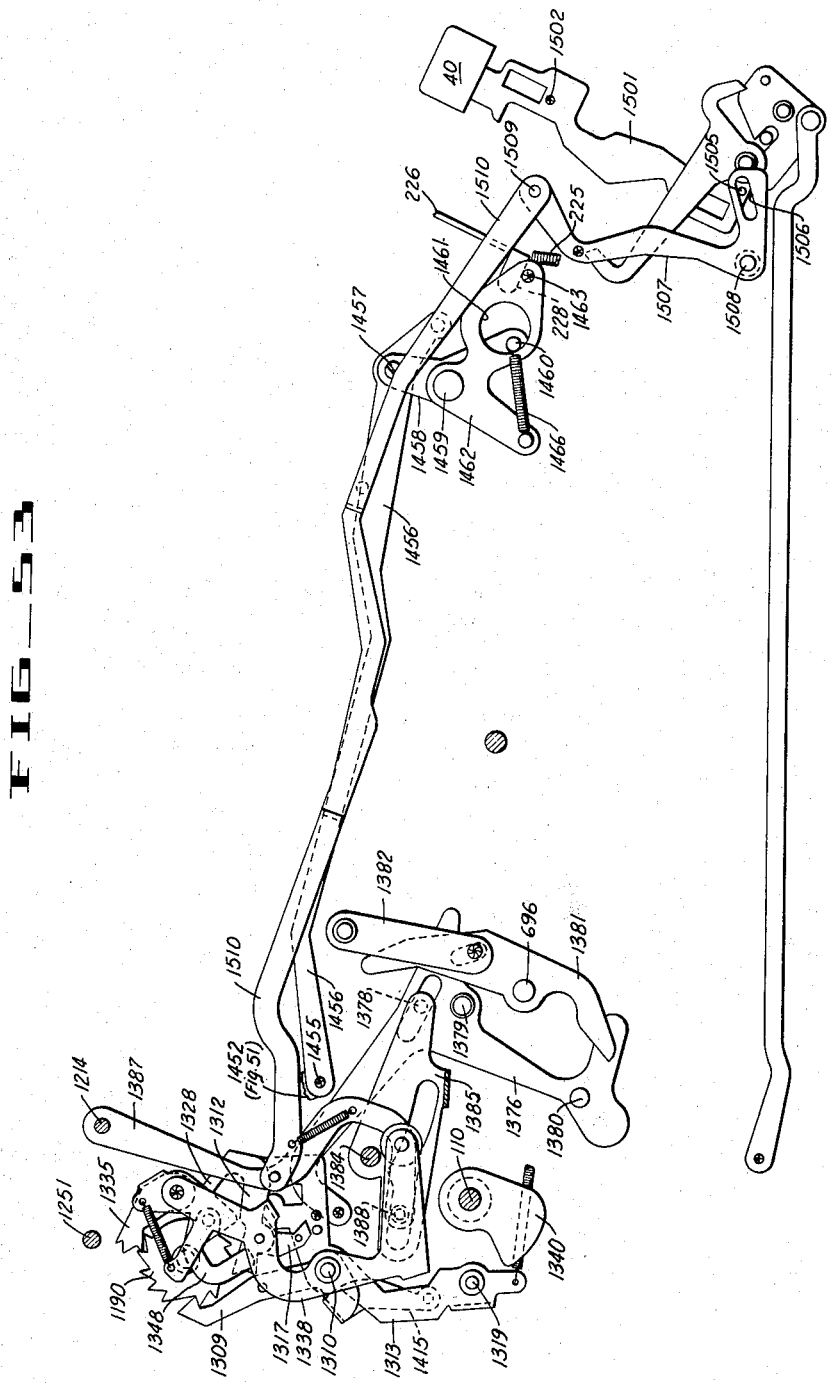
FIG_53

United States Patent Office 3,214,097
Patented Oct. 26, 1965

3,214,097
MULTIPLICATION CONTROL FOR
CALCULATING MACHINE
Harold J. Chall, Castro Valley, Calif., and Giovanni
Pastrone, Milan, Italy, assignors, by mesne assignments,
to Friden, Inc., San Leandro, Calif., a corporation of
Delaware
Original application Nov. 27, 1961, Ser. No. 154,972.
Divided and this application Aug. 16, 1962, Ser. No.
223,861
10 Claims. (Cl. 235—145)

TABLE OF CONTENTS

| | Column |
|---|---|
| I. SELECTOR, ACTUATOR AND ACCUMULATOR | 3 |
| II. MULTIPLIER-STORAGE, OR MEMORY, UNIT | 3 |
| III. SHORT-CUT MULTIPLICATION | 4 |
| IV. SENSORS FOR THE MULTIPLIER-STORAGE SECTORS | 4 |
|     1. Method of Sensing Digits | 5 |
|     2. Alternative Digit Sensor | 6 |
|     3. Carry Mechanism of Digit Tester | 6 |
|     4. Short-Cut Test | 6 |
|     5. Holding the Carry In Short-Cut Tester | 7 |
|     6. Transferring the Carry to Digit Tester | 7 |
|     7. Termination Test | 7 |
|     8. Resetting the Termination and Short-Cut Testers | 8 |
| V. SENSOR CARRIAGE | 8 |
|     1. Clutch for Sensor and Selector Carriages | 8 |
|     2. Homing the Sensor Carriage | 9 |
| VI. MULTIPLICATION CONTROL MECHANISM | 9 |
|     1. Counter Ratchet Wheel 1190, Stop Pawl 1309, and Poker 1312 | 9 |
|     2. Counter Ratchet Feed | 10 |
|     3. Digitation Block Cam 1355 | 11 |
|     4. Digitation Set | 12 |
|     5. Digitation Sign Control | 12 |
|     6. Multiplier Key and Multiplier Bar 1050 | 13 |
|     7. Main Multiplication Lever 1322 | 14 |
|     8. Counter Overstroke and Termination Test | 15 |
| VII. EXAMPLE OF MULTIPLICATION (MULTIPLIER 4950) | 16 |
|     1. Initial Setting of Controls | 17 |
|     2. Initial Half-Cycle (Multiplier Digit "0") | 17 |
|     3. Mid-cycle; Counter Overstroke | 18 |
|     4. Second Half of First Cycle: Shifting, Testing Next Order (Digit "5," "No-Carry"), Setting Controls | 18 |
|     5. Four Cycles of the Second Order | 19 |
|     6. Fifth Cycle of Second Order | 19 |
|     7. Third Order (Digit "9" With Carry) | 20 |
|     8. Fourth Order (Digit "4" With Carry), Termination Test | 21 |
|     9. Print-Out Cycle, Homing the Controls | 22 |
| VIII. NEGATIVE MULTIPLICATION | 22 |

This application is a division of our copending application, Serial No. 154,972, filed Nov. 22, 1961 for Calculating Machine.

The present invention relates to calculating machines, and particularly to machines for performing plural-order multiplication automatically.

The present invention is embodied in the same machine that is diclosed more fully in the copending application of Harold J. Chall, Serial No. 138,645, filed September 18, 1961, now Patent No. 3,145,923, issued Aug. 25, 1964, and of Harold J. Chall and Charles W. Wiedeman, Serial No. 117,096, filed June 14, 1961, now Patent No. 3,108,-745, issued Oct. 29, 1963, to which reference will be made for supplementing the description herein. For convenience, identical parts are identified by the same reference numerals in this and in those copending applications. The calculating machine of the present invention constitutes an improvement on the well-known Friden ten-key adding machine, shown, for example, in Chall, Patent No. 2,832,530, and includes mechanism for automatically carrying out multiplication and for registering the results thereof in various manners.

An object of the present invention is the provision of an improved, automatic, high speed, printing, calculating machine and an improved multiplication control therefor in which the multiplier sensors are actuated by the operator keys for sensing the first order of the multiplier and setting the multiplier controls before the initial machine cycle, in which a spring-driven control bar is manually controlled for making those initial sensing and setting operations before power cycling begins, and in which said bar is returned to home by power at the completion of the multiplication operation.

And it is a further object of the present invention to provide an improved control for a high speed printing calculator.

These and other objects and advantages of the present invention will be apparent from the following description of a specific embodiment thereof, and from the claims, taken in connection with the accompanying drawings in which:

FIG. 1 is a right elevational section constituting a general view of the calculating machine embodying our present invention.

FIG. 2 is a perspective view from approximately the right front showing the digit sensor of the multiplier unit.

FIG. 3 is an exploded perspective view from the upper right front showing the cams on the rear drive shaft of the machine.

FIG. 4 is a right elevational partial section showing a mechanism on the right side of the machine for controlling accumulator entries and totals.

FIG. 5 is a perspective view from the upper right front, of the rear portion of the machine, showing the multiplier-storage, or memory, sectors, and part of the multiplication control mechanism.

FIG. 6 is a rear elevation of the machine.

FIG. 7 is a partially exploded perspective view from the upper left front showing the mechanism for interconnecting and controlling the carriages for the selector unit and the multiplier-storage unit.

FIG. 8 is an exploded perspective view taken from the upper right front showing parts of the mechanism for controlling the multiplier-storage unit, which appear also, for example, in FIG. 1.

FIG. 9 is an enlarged right elevational detail showing the multiplier sensors, which appear also, for example, in FIG. 1.

FIGS. 10 to 13, inclusive, are enlarged right elevational details for explaining the operation of the digit sensor in sensing a number in the storage unit.

FIGS. 14 to 16, inclusive, are enlarged right elevational details for explaining the action of setting the digit sensor for the "carry" and "no-carry" conditions.

FIG. 17 is an enlarged right elevational detail depicting the termination test.

FIGS. 18 to 21, inclusive, are right elevational views, similar to FIGS. 10 through 13, showing a modified construction for the digit sensor and depicting its operation.

FIG. 22 is an exploded perspective from the upper left rear showing certain parts of the multiplication control.

FIGS. 23 to 31, inclusive, are enlarged left elevational sections of the mechanism shown in FIG. 22.

FIGS. 32 to 50, inclusive, are enlarged left elevational views of the mechanism of FIG. 22 for explaining its operation.

FIG. 51 is a left elevational fragmentary section showing part of the multiplication control, including part of the mechanism of FIG. 22.

FIG. 52 is a top detail view of the carriage clutch which appears also in FIG. 7.

FIG. 53 is a left elevational fragmentary section showing part of the multiplication control mechanism.

I. SELECTOR, ACTUATOR AND ACCUMULATOR

As shown in FIG. 1, a ten-key selection unit 8 includes sixteen, differentially-settable, ordinal sectors 196 mounted on a transversely movable carriage. The digits of a number are entered in succession, most significant order first, by means of keys 10, and the selector carriage indexes to the left one order for each digit so entered. The carriage also is indexed to the left during multiplication as will be described. An actuator includes seventeen ordinally-arranged sectors 340 and is provided with a front gear pendant 390 for engagement with the sectors 196 of the selector unit. A rear gear pendant 420 swings into engagement with drive gears 444 of an accumulator 446. Print wheels 1610, geared to the actuator sectors 340, print numbers while they are in the actuator, at about mid-cycle.

The machine includes mechanism and controls for the usual adding machine functions of addition, subtraction, print-only, repeat, total, subtotal, clear keyboard and backspace, some of which are utilized in the automatic multiplication operations to be described. In particular, these controls include an add-subtract shaft 696 (FIGS. 1 and 4) which is rotated, counter-clockwise in these figures, through a few degrees for causing an addition operation, and substantially twice that angle for causing a subtraction operation. The control also include a total-subtotal shaft 56 which may be rocked, counter-clockwise in these figures, a few degrees for causing a total operation, and substantially twice that angle for causing a subtotal operation. These control shafts 696 and 560 extend through to the left side of the machine (FIGS. 40 and 51) for actuation by the multiplication control mechanism.

II. MULTIPLIER-STORAGE, OR MEMORY, UNIT

The multiplier-storage unit, or memory unit, includes seventeen identical differentially-settable storage sectors 970 (FIGS. 1, 5 and 9) mounted for free rotation on a common shaft 972 supported in the frame of the machine. Numbers are transferred to these sectors from the actuator sectors 340 by means of actuator pawls 974 pinned at 975 to the actuator sectors. Each pawl has a pair of gear teeth 976 arranged to be lifted into engagement with gear teeth 977 in the lower edge of its storage sector 970.

As shown in FIG. 1, each sector 970 of the memory, or multiplier-storage, unit is provided with a detent 1055 journalled on a pin 1056 and rocked by a spring 1057 (counter-clockwise in FIG. 1) for urging the corner of an ear at its forward end into engagement with the notched edge of an arcuate slot in the storage sector 970. Thus the detent 1055 tends to hold the sector 970 in any digit position in which it is set.

It is desirable, during multiplication operation to positively lock the sectors 970 for preventing any accidental shifting thereof. Accordingly, a bail 1063 is provided for blocking the detents 1055. Normally, this bail occupies the position shown in full lines in FIG. 1. During a multiplication operation, it is moved rearward to underlie projection 1054 of every detent lever 1055 and prevent any change in the settings of the memory sectors 970.

As is shown best in FIG. 8, the left leg of bail 1063 carries a pin 1064 that lies in a cam slot 1065 of a bail 1060, which is journalled at 1061 and has a slot 1062 in a depending arm embracing a pin 1049 on a multiplication bar 1050 (FIG. 51). As will be described, bar 1050 is moved forward by the multiplication key 38 and rocks bail 1060 (clockwise in FIG. 8) for camming bail 1063 (also clockwise) into its rear position shown in FIG. 1.

Other details of the multiplier-storage, or memory, unit, and the mechanism and controls for transferring numbers into and out of it, are described in the copending applications Serial Nos. 138,645 and 117,096 already referred to.

III. SHORT-CUT MULTIPLICATION

The machine of the present invention performs multiplication by repeatedly entering the multiplicand from the selector into the accumulator under control of the digits of the multiplier in the memory, or multiplier-storage, unit. More particularly, it employs a process of short-cut multiplication. Several specific programs for short-cut multiplication are well known, and in general they are characterized by adding the multiplier into the accumulator for small multiplier digits and subtracting it for large multiplier digits, with a positive carry into the next highest order after such a subtraction. If it is desired to enter the product subtractively into the accumulator, all of these operations are inverted. In that case, for a small multiplier digit, the multiplicand is entered subtractively, and for a large multiplier digit, the multiplicand is entered additively and a negative carry is entered in the next higher order. Accordingly, in this specification the short-cut multiplication process will, at times, be spoken of as employing selected-sign and inverse entries.

In the machine of the present invention, the multiplicand and its multiples of ten are entered according to the selected sign the required number of times for multiplier digits of "1" to "4," inclusive, and are entered inversely when the multiplier digits have values of "5" to "9," inclusive. Following an inverse entry, a selected-sign carry must be introduced in the next higher order of the multiplier, the effect of which is to produce either an additional selected-sign entry in that order, or one fewer inverse entries.

The control proceeds from the lowest order of the multiplier to the highest. Thus, if the multiplier is "26," the machine responds first to the "6." The multiplicand will be entered inversely four times, the multiplicand will be shifted to multiply it by "10" and that tens multiple of the multiplicand will then be entered according to the selected sign three times, twice for the digit "2" and once for the carry. If the multiplier is "96," the machine will first respond to the "6" and enter the multiplicand from the selector four times inversely. Then when the machine responds to the "9," which, by itself, calls for one inverse entry, it must also respond to the carry from the lower order, so that no entry will be made of the tens multiple of the multiplicand. Although the multiplier has only two digits, the inverse operation in response to the "9" in the second order requires a carry in the third order, and consequently the machine shifts again and makes a single selected-sign entry of the hundreds multiple of the multiplicand.

IV. SENSORS FOR THE MULTIPLIER-STORAGE SECTORS

It will be apparent from the foregoing that the machine must test, or sense, the number in each order of the multiplier for determining whether the entries are to be of the selected sign or inverse, and for determining the number of such entries to be made, taking into account the carry, if there is one, from the previous order. It is also necessary to provide for stopping the operation of the machine, and it is desirable that the operation be stopped as soon as all of the required entries have been made in the accumulator.

The feelers or sensors which make these tests on the sectors of the memory unit are shown in FIG. 9. There, one sector 970 of the memory, or multiplier storage, unit is shown in its "0" position. In this position a step 1153, labeled "0," is aligned with one edge 1154 (the lower edge in FIG. 9) of a broad-shouldered probe, or feeler, 1151, which is part of a two-part probe 1150 of a digit sensor 1148. The complete probe 1150 (see also FIG. 2) includes also a shiftable tongue 1152, which, in the normal condition of the machine, lies opposite the lower edge 54 of the shoulder probe 1151, as shown in FIG. 9.

The test for the sign of the entries is made by a short cut feeler 1160 (FIG. 9) which tests the surface of the "9" step 1161 of sector 970. If the sector contains any digit from "0" to "4," the step 1161 will lie under and support the feeler flange 1160, but if the sector 970 contains a digit of "5" or more, the face 1161 will be clear of the feeler and let it drop, as shown, for example, in FIG. 12.

The test for termination is made by a feeler 1165 which tests all of the sectors 970 of orders above, that is, to the left of, the sector with which the feelers 1150 and 1160 are aligned. A deep notch 1166 in each sector 970 is aligned with the feeler 1165 when the sector contains a "0." It also tests for a carry, as will be explained.

1. *Method of sensing digits*

It will now be explained how the digit feeler 1150 (FIG. 9) tests the position of the memory sector 970 for determining the number of times the multiplicand is to be entered into the accumulator, and how, as a part of this test, it takes account of the carry required by an inverse entry in the previous order. As was explained previously, a "0" stored in the memory sector 970 is indicated by the sector standing in the position shown in FIG. 9. In this position the radial rise 1170 between the "0" step 1153 and the "1" step 1171 is aligned with the center of the shoulder probe 1151. A "1" is indicated by the sector standing in the position (clockwise in FIG. 9) from the position shown in that figure by an angle corresponding to the angular width of the step 1171. A "2" is indicated by the sector standing at the position twice this angle from the position shown in FIG. 9, etc.

When there is no carry from an inverse operation in the previous order, the tongue probe 1152 is aligned with the lower corner 1154 of the shoulder 1151. A number from "0" to "4" in the sector is then sensed or tested by moving the complete feeler 1150 radially toward the sector until it is stopped by engagement of the tongue probe 1152 with one of the steps 1153, 1171, etc., as in FIG. 10. The number of entries of the multiplier to be made in the accumulator is determined, by mechanism to be described, by the distance that the probe 1150 thus moves. If a carry is required, the tongue probe 1152 will have been lifted to lie opposite the upper corner 1155 of the shoulder probe 1151, as shown in FIG. 11, in which case the complete feeler 1150 will move in toward the sector until the corner 1154 strikes the plate (for values from "0" to "4"). It will be noted that the "carry" condition causes the feeler to move in toward the plate one unit farther (for numbers from "0" to "4") than if the tongue probe 1152 had been in the "no-carry" position (FIG. 10) and, accordingly, the sensor indicates to the control mechanism an extra unit to account for the carry.

For number "5" to "9," the upper corner 1155 of the shoulder probe 1151 lies opposite the step to be sensed. For example, in FIG. 12 the feeler 1150 is shown sensing a "5." The tongue probe 1152, being in the no-carry position, lies opposite the lower shoulder 1154 and so does not engage the step of the sector 970, and the machine will make five inverse entries of the multiplicand into the accumulator. When the tongue probe 1152 is in the carry position, as shown in FIG. 13, it lies in front of the upper corner 1155 of the shoulder probe and so engages the step of the plate and holds the feeler 1150 approximately one step farther away from the center of the sector 970 than it would for a no-carry condition, and will cause the mechanism to make only four inverse entries.

2. *Alternative digit sensor*

FIGS. 18, 19, 20 and 21 show an alternative construction for the digit sensor. In FIG. 18, a single feeler 1180 is provided with a lower shoulder 1181, an upper shoulder 1182 and a tongue 1183, which tongue 1183 is shown engaging the "1" step under a no-carry condition. Under a carry condition, the feeler 1180 will be swung to the dotted line position 1180–a in FIG. 18, and will move in an additional step distance for sensing the same "1" step of the memory sector as shown in FIG. 19. Similarly, FIGS. 20 and 21 show the probe 1180 in, respectively, the no-carry and carry conditions when sensing a "6" in the memory sector. It is to be noted that the operation of this alternative feeler is similar to that of the construction shown in FIG. 9 in that the protruding tongue and the lower shoulder test, respectively, the no-carry and carry conditions in the "0" to "4" range and the upper shoulder and the projecting tongue test, respectively, the no-carry and carry conditions in the "5" to "9" range.

3. *Carry mechanism of digit tester*

At the beginning of a multiplying operation, the sensors will occupy the positions shown in FIG. 9. The digit tester 1148 includes a frame 1191 (see also FIGS. 2 and 5) supported by pins 1188 in two slots 1192 and 1193 in a sensor carriage frame 1194 (FIGS. 2 and 7) that is mounted for transverse movement in the machine (see also FIG. 6). As seen best in FIGS. 2 and 9, the shoulder portion 1151 of the probe 1150 is a part of the frame 1191. The tongue portion 1152 is carried on a lever 1195 journalled on a pin 1196 in the frame 1191. A latch 1203 has at its rear end a slot 1204 embracing the pin 1196. Near its front end it carries a pin 1205 which extends through a slot 1206 in the right side of the frame 1191. The latch 1203 is thus slidably guided in the slot 1206 and on the pin 1196. A spring 1207 biases the arm 1195 (counter-clockwise in FIG. 9) about its supporting pin 1196, and also biases the latch 1203 rearward for holding the pin 1205 against a shoulder 1208 of the lever 1195. A force applied against an abutment 1224 on an arm 1225 of the lever 1195 will rock the lever (clockwise in FIG. 9) for introducing the carry. This action lifts shoulder 1208 above the pin 1205 as shown in FIG. 16 so that the latch 1203, urged by spring 1207, moves rearward under the edge 1209 for latching the lever 1195 in the "carry" position, as shown, for example, in FIG. 11. With the parts in the "carry" position as shown in FIG. 11, a force applied against a prong 1222 of the latch 1203 will move the latch (to the left and down in FIGS. 9 and 11) for releasing the lever 1195 so that, under the force of the spring 1207, it returns (counter-clockwise in FIG. 9) to the no-carry position shown in FIGS. 9 and 10.

Sensor frame 1191 has at its lower edge a gear rack 1186 in mesh with a gear 1187 keyed to, but slidable along, a square portion of the shaft 1189. Shaft 1189 controls the movement of the digit sensor 1148 in the slots 1192 and 1193 (FIG. 7) toward and away from the storage sector 970, and transmits the sensed value to a counter ratchet wheel 1190 on the shaft 1189 (FIGS. 22 and 24).

4. *Short-cut test*

The test of whether the entry of the multiplicand is to be of selected sign or inverse sign is performed by lowering a lever 1213 which carries the flange 1160 (FIGS. 5 and 9). This lever rocks about an upper guide rail 1251 and is lifted and lowered by a bail rod 1214. If the number in the storage sector 970 is "4" or less, as in FIGS. 10 and 11, the flange 1160 is stopped by the step 1161 of the storage sector, and this test action does not alter any other mechanism, so that the entries are made with the selected sign. If the number stored in the sector s "5" or more, as in FIGS. 12 and 13, the flange 1160 will miss the abutment 1161 and permit the lever 1213 and bail 1214 to drop. The dropping of bail 1214 controls the inverse entries, as will be described. Also, as lever 1213 drops, an upper flange 1215 drives down against a hook lever 1216 for rocking it (counter-clockwise in FIG. 9). This hook lever is journalled on a pin 1217 on the carriage frame 1194 (FIGS. 5 and 7) and its rear end is pinned to a link 1218 (FIG. 9), the lower end of which has a slot 1219 embracing a pin 1227 in the frame 1194. A spring 1220 biases the link 1218 down and the hook lever 1216 (clockwise in FIG. 9) toward their normal, no-carry position.

5. Holding the carry in short-cut tester

As indicated in FIG. 14, a latch 1233 is provided for retaining the link 1218 in its upper, or carry, position. As is shown best in FIG. 15, this latch 1233 is journalled on the pin 1217 and is provided with a spring 1234 for biasing it (clockwise in FIG. 15). Thus, when the link 1218 is raised in response to the sensing of a "5" to "9" multiplier digit by the lever 1213, the latch 1233 moves to the position 1233–a, shown in dotted lines in FIG. 15, for engaging an ear 1235 on the link 1218 for latching the link 1218 in its upper or "carry" position.

6. Transferrnig the carry to digit tester

Link 1218 includes an ear 1221 which, in the normal lower position of the link 1218, is aligned with the rear prong 1222 of the sliding latch 1203 of the digit tester 1148, as shown in FIG. 9 and in solid lines in FIG. 14. In the upper, carry-indicating position of the link 1218 (shown in dotted lines in FIG. 14), a pin 1223 is aligned, as indicated at 1223–a, with the abutment face 1224 on the arm 1225 of the lever 1195. During the last machine cycle in each order of the multiplier, the digit testing unit 1148 is moved rearward to a counter-overstroke position, to be described, so that the abutment face 1224 abuts the pin 1223, or the latch prong 1222 abuts the ear 1221, for setting the lever 1195 to the carry or no-carry position, respectively, in accordance with the position of the flange 1160 (FIG. 9) and link 1218, as set by the short-cut test in that order of the multiplier. This setting of the lever 1195 determines whether or not a "carry" is to be included in the next order of the multiplier. This setting is used only in the digit test for that next order, but remains until the next counter-overstroke.

7. Termination test

Late in the last machine cycle of each order the termination test is made for determining whether the multiplication has been completed. For this purpose the blade 1165 is lowered (FIGS. 5, 9 and 17). This blade is part of a lever 1241 which rocks about a lower guide rail 1252. This lever includes an arcuate portion 1243 that lies in a slot in the rear skirt of the frame 1194, for guiding the arm 1241 and keeping the blade 1165 in proper ordinal alignment with the other testing elements 1150 and 1160 (FIG. 9). The lever 1241 and blade 1165 are controlled by a bail 1244 supported in levers 1245 and 1246 (FIGS. 5, 29 and 51). If all higher orders are at "0" and lever 1216 is at no-carry, the blade 1165 and the bail 1244 will drop to the position shown in solid lines in FIG. 17. This dropping of bail 1244 will control the termination of the multiplication operation, as will be explained. If a carry has been set, the link 1218 (FIGS. 9 and 15) will still be latched in its upper position so that the hook lever 1216 will be held in its counter-clockwise position 1216–a, indicated in dotted lines in FIG. 17. In this position the hook 1247 of the lever 1216 wll stop the bail 1244 in the position 1244–a shown in dotted lines. Alternatively, if any one of the sectors 970 of orders higher than the one just completed is not at the "0" position, the deep slot 1166 of that sector will not be aligned with the blade 1165 and consequently that sector will prevent the bail 1244 from falling to the full line position shown in FIG. 17.

In either of these situations, the operation will be continued and the sensors will test the next higher order of the multiplier-storage unit.

8. Resetting the termination and short-cut testers

After the termination test, bail 1244 is lifted and carried past its home position to an overstroke position 1244–b shown in dotted lines in FIG. 17, at which it strikes the latch 1233 (see also FIG. 15), and rocks this latch counter-clockwise in these figures for permitting the spring 1220 to return the link 1218 and the hook lever 1216 to their normal no-carry position shown in solid lines in FIGS. 9 and 14. The bail 1244 then moves down slightly to its home posiiton 1244–c, indicated by dotted lines in FIG. 17. It is to be noted that the return of the link 1218 and hook lever 1216 to the normal, no-carry position shown in FIG. 9, occurs after the lever 1195 of the digit sensor has been set to carry, or released, as required for the next order, and that this return of the link 1218 does not immediately affect the setting of lever 1195.

V. SENSOR CARRIAGE

Carriage frame 1194 for the multiplier sensors slides on the two transverse rails 1251 and 1252 (FIGS. 1, 5, and 6). It is biased toward the left of the machine by a spring 1253 (FIG. 6). A gear rack 1254 (FIG. 7), carried by the carriage frame 1194, is in mesh with a spur gear 1255 on a shaft 1256 which carries a bevel gear 1257 in engagement with a second bevel gear 1258 fixed to a shaft 1259 (see also FIG. 52).

1. Clutch for sensor and selector carriages

Shaft 1259 has a square portion carrying a sliding, toothed, clutch plate 1264 with a grooved hub engaged by a control bellcrank 1262 (FIGS. 52 and 7). The teeth of clutch plate 1264 are arranged to engage the teeth 1265 of a spider fixed to the gears 246 and 250. As is shown in FIG. 7, gears 250 and 246 are connected through a rack bar 242, gears 236 and 234, and rack bar 232 to the left frame 179 of the selector unit. The selector unit is biased to the left of the machine by a spring 183, and, as is explained more fully in the copending applications Serial Nos. 138,645 and 117,096 previously referred to, it is provided with an escapement that may be operated by lever 226 in FIG. 53. Thus during multiplication the clutch 1264, 1265 (FIGS. 7 and 52) serve to connect the multiplier readout sensor carriage with the selection unit carriage, which will contain the multiplicand, so that the two carriages may be indexed together, leftward, order-by-order.

The right-hand end 1266 of the bellcrank 1262 (FIG. 52) engages the upper end of a lever 1267 journalled at 1268 (FIG. 51). Lever 1267 has an ear 1269 at its lower end, by which it is engaged for operation by bar 1050 upon initiation of the multiplication operation. A spring 1270 (FIG. 51) at the lower end of the lever 1267 biases the lever end 1266 (FIG. 52) forward for biasing the plate 1264 away from, and clear of, the spider 1265 for disconnecting the multiplier sensor carriage from the selector unit. A latching bellcrank 1271 (FIG. 51), carried on the same journal 1268 as lever 1267, has a depending arm 1272 which is connected by a spring 1273 to the lever 1267, for biasing the bellcrank 1271 (clockwise in FIG. 51) and for normally holding it against the stop 1274. When in this normal position, the latch 1271 intercepts a pawl 1275 which is fixed to the shaft 1259. Since shaft 1259 (FIGS. 7 and 52) is geared to the multiplier sensor carrigae 1194, this engagement of the pawl 1275 (FIG. 51) by the latch 1271 prevents leftward movement of the multiplier sensor unit. Specifically, the parts are so adjusted that the latch 1271 holds the multiplier sensors in alignment with the first, right-hand, or lowest order of the multiplier unit. That is, the position at which it begins a multpilying operation.

When a multiplication operation is initiated, the lower end of lever 1267 is moved forward (to the right in FIG. 51) and as it moves it immediately begins moving the clutch plate 1264 (FIG. 52) for bringing it into engagement with the spider teeth 1265. Because there is considerable lost motion between the lever 1267 (FIG. 51) and the lower arm 1272 of the latch 1271, that latch does not move immediately. Consequently, as the lever 1267 is swung (counter-clockwise in FIG. 51), the spring 1273 continues to hold the latch 1271 in engagement with the pawl 1275. After the clutch 1264, 1265 (FIGS. 7 and 52) has been firmly engaged, the lever 1267 (FIG. 51) abuts an ear 1276 on the arm 1272 and withdraws the latch 1271 from the pawl 1275, thereby freeing the multiplier sensor carriage 1194 for movement with the selector unit during the operation of multiplication.

2. *Homing the sensor carriage*

At the end of the multiplying operation, the lever 1267 will be restored to its normal position shown in FIG. 51. This action will disengage the clutch 1264, 1265 (FIG. 52) and will restore latch 1271 to its pawl-interceptive position. However, the pawl 1275 will be out of its normal position, and consequently the carriage 1194 will run free under the force of the spring 1253, toward the left until an ear 1281 on the frame 1194 abuts the upper end 1282 of a restoring lever 1283 (FIGS. 6 and 7). The lower end of lever 1283 has a slot 1284 embracing a pin 1285 on a lever 1069 which, through bellcrank 1073, 1074 (FIG. 7), gears 250 and 246, and racks 242 and 232, is continuously coupled to the selector carriage. As the selector carriage is restored toward the right of the machine, as described in the applications Serial Nos. 138,645 and 117,096 and the patent previously referred to, lever 1283 is rocked (counter-clockwise in FIG. 6) for driving the carriage 1194 toward the right of the machine (toward the left in FIG. 6). It will be recalled from the patents previously referred to that the selector unit, when restored, is moved to the right beyond its home position. This motion similarly carries the carriage 1194 to the right beyond its home position, and in so doing, swings the pawl 1275 (clockwise in FIG. 51) through the position shown in that figure. The pawl 1275 rocks the latch 1271 down and then catches behind it. This action leaves the multiplier sensor unit in its home position in alignment with the first order of the multiplier where it will remain until another multiplication operation is initiated.

VI. MULTIPLICATION CONTROL MECHANISM

Most of the mechanism that controls the multiplier-storage sensors, and that controls the multiplying operation in response thereto, is located in a compact assembly at the upper rear portion of the machine, to the left of the sensor carriage, as indicated at 1305 in FIG. 5. This mechanism is shown partially exploded in the pictorial view of FIG. 22, and in home position in FIGS. 23 to 31, inclusive. Certain operating sequences are shown in FIGS. 32 through 49. These parts and their operation will first be described by groups, and then their combined operation will be detailed in an example of multiplication.

1. *Counter ratchet wheel 1190, stop pawl 1309, and poker 1312*

Fixed to the shaft 1189 is a pulley 1306 about which is wrapped a coil spring 1307 (FIGS. 5, 22 and 45) for biasing the shaft (counter-clockwise in FIGS. 1 and 9; clockwise in FIG. 45) for urging the digit sensor 1148 toward the storage sectors 970 of the memory unit. Also fixed to shaft 1189 is the counter ratchet wheel 1190 which is normally engaged by a stop pawl 1309 (FIGS. 22 and 24). This pawl is journalled at 1310 and biased by a spring 1311. The spacing of the teeth on the ratchet wheel 1190 corresponds substantially to the radial difference between the steps on the storage sectors 970, as, for example, between the steps 1153 and 1171 in FIG. 9. As shown in FIG. 10, the "0" position of the ratchet wheel 1190, as determined by the digit tester 1148, is slightly different from the home position, which is also a "0" position, determined by stop pawl 1309. This difference provides a small clearance between probe 1152 (FIG. 9) and the "0" and "9" steps 1153 and 1161 of the storage sector 970 when the tester 1148 is home. A similar small difference may also appear at the other count positions, as shown in FIG. 12.

The stop pawl 1309 is arranged to release the ratchet wheel at the beginning of the multiplication operation by a forward motion of the multiplication control bar 1050, as shown in FIGS. 44 and 45. It is this release of the ratchet wheel 1190 that lets the spring 1307 move the sensor 1150 (FIG. 9) against the storage sector 970 for determining the number of times the multiplicand must be entered. The stop pawl 1309 must also be disengaged from the ratchet wheel 1190 for sensing each of the other orders, and this action is performed by a poker 1312 (shown in FIGS. 22, 25 and 26), which drives against a pin 1316. Power 1312 is carried by a lever 1313, which is part of a bail 1314, journalled at 1310. During the multiplication operation, a roller 1319 on bail 1314 rides a cam 1315 on the rear drive shaft 110, which rotates, counter-clockwise in FIG. 22, one revolution during each machine cycle. Arm 1313 carries a pin 1320 (FIG. 27) which, in the home position of the machine, is engaged by a hook 1321 on a main multiplication control lever 1322 (FIGS. 28 and 49) for latching the lever 1313 in its home position, in which it is shown in FIGS. 25 and 26. In its home position the poker 1312 is held in an elevated position by a spring-urged latch 1317 (FIG. 26) which rests atop a pin 1318 on the lever 1313. In this position the poker 1312 is above, and out of alignment with, the pin 1316 on the stop pawl 1309.

Upon initiation of the multiplication operation, the lever 1322 (FIG. 28) is rocked to release the pin 1320 and thereby to release lever 1313 (FIG. 25) to the control of its cam 1315. At the same time, a trident latch 1326 (FIG. 24) is swung, as will be explained, against a pin 1327 on the latch 1317, as shown in FIG. 36, and lets the poker 1312 drop, as shown in FIGS. 37 and 38. The poker 1312 includes an arm 1328 which overlies a pin 1329 on the counter ratchet wheel 1190. Whenever the counter wheel 1190 contains a "0," pin 1329 will lie approximately in the position shown in FIGS. 25 and 38, and under this condition, the pin 1329 will hold the poer 1312 in alignment with the pin 1316, as shown in FIG. 38, so that, as arm 1313 is rocked by the cam 1315, the poker 1312 will strike the pin 1316 for releasing the counter wheel 1190 for again moving the value sensor 1150 (FIG. 9) into engagement with the storage sector 970.

If the ratchet wheel 1190 contains a "1" or a larger digit, the pin 1329 will permit the porker 1312 to drop below the pin 1316, as shown, for example, in FIG. 37. Under this condition, as the arm 1313 is rocked, once each cycle, the poker 1312 will pass under the pin 1316 and will not affect the operation of the rachet wheel 1190 or its stop pawl 1309. In the last cycle for each order of the multipler, the ratchet wheel 1190 is moved into an overstroke position so that pin 1329 lifts the poker 1312, as shown in FIG. 39. When this action is followed by a successful termination test, the trident latch 1326 will swing clockwise from the position shown in FIG. 38 and clear of the pin 1327 on the latch 1317, so that the latch 1317 can reposition itself atop the pin 1318 for holding the poker in its home position, as shown in FIG. 26.

2. *Counter ratchet feed*

A counter ratchet feed pawl 1335 is shown in FIGS. 22 and 23. This pawl is part of a bail member 1336 (FIG. 24) journalled at 1337 on a lever 1338. This ever is journalled at 1310, is biased clockwise in these views by a spring 1341, and carries a roller 1399 arranged to ride on a counter feed cam 1340 on the rear drive shaft 110. In the home position of the machine, the pawl 1335 and the lever 1338 are latched in an inactive position by the trident latch 1326. Thus in FIG. 23 the trident latch 1326 engages an ear 1345 on the lever 1338, and, as shown in FIG. 24, a projection 1346 of the latch 1326 lies under a tip 1347 on an arm 1348 of the bail 1336 for holding the feed pawl 1335 clear of the teeth of the counter ratchet wheel 1190.

During the multiplication operation the lever 1338 and the bail 1336 are free of the trident latch 1326, as shown in FIG. 32. Under this condition the arm 1338 is rocked once each machine cycle by the cam 1340 for advancing the ratchet wheel 1190 one notch (counter-clockwise in these figures) for each revolution of the cam 1340, that is, once each machine cycle. The two extreme positions and an intermediate position of drive pawl 1335 are shown in dotted lines in FIGS. 37 and 38. The stroke of the pawl 1335 exceeds the spacing of the notches on the wheel 1190 to provide an overstroke, as shown in FIG. 39, which is required in the last count in each order of the multiplier, and to provide a pre-stroke to ensure pickup of the ratchet tooth, particularly in the first count in each order, for example, with the ratchet wheel as shown in FIG. 10. Thus in FIG. 37 the counter ratchet wheel 1190 stands at its "1" position. One stroke of the drive pawl 1335 will pick up the last tooth (extreme clockwise tooth) at pawl position 1335-*a*, shown in dotted lines, and carry it through the "0" position to the overstroke position of FIG. 39 (pawl position 1335-*c* in FIG. 37). When the counter wheel contains a "0," as shown in FIG. 38, the pawl 1335 does not drive the wheel a full tooth space. It picks up the same last tooth and drives the ratchet wheel 1190 to the same overstroke position. In the full stroke, or extreme rearward, position of the pawl 1335 (FIG. 33), an upper notch 1333 stops against an overthrow stop 1334 which, in a known manner, stops the pawl 1335 and also holds it against the ratchet wheel 1190 for preventing overthrow thereof.

In its extreme forward position, shown in FIG. 32, the drive pawl 1335 is clear of the ratchet wheel 1190, and the tip 1347 of arm 1348 stops against the ear 1345 on lever 1338. The stop pawl 1309 is released by the poker 1312 (for example, in FIG. 38) when the drive pawl 1335 is in this extreme forward position, and, therefore, disengaged from the racket wheel. When the trident latch is released at the end of the multiplication operation, it will first assume a position such as that shown in FIG. 33 with respect to arm 1348 of the bail 1336. Then as the arm 1338 rocks (clockwise in this figure), a heel portion 1349 of the arm 1348 rocks against the projection 1350 (FIG. 34) of the trident latch 1326 for lifting the tip 1347 above the projection 1346, as shown in dotted lines in FIG. 34 and full lines in FIG. 35. Then, when the arm 1338 is again rocked (counter-clockwise in these figures) the trident latch 1326 re-engages the ear 1345 for returning these parts of their home position shown in FIGS. 23 and 24.

3. Digitation block cam 1355

A digitation block cam 1355 (FIGS. 22 and 28) rocks free on the shaft 1189 and is biased clockwise in these figures both by its own weight and also by a spring 1354. It is supported in its home position shown in these figures by the pin 1329 on the counter ratchet wheel 1190, when that wheel is in its home position. In this position cam 1355 abuts a bracket 1356 on the bail 1214 which controls the short-cut test. When the stop pawl 1309 (FIG. 26) releases the ratchet wheel 1190 at the beginning of each order, cam 1355 moves with the ratchet wheel 1190, and, among other things, lowers the bail 1214 for the short-cut test.

The cam 1355 also controls a lever 1360 (FIG. 28) journalled at 1361 and biased counter-clockwise in this figure by a spring 1362 (FIGS. 24, 22 and 40). A roller 1363 on the arm 1360 cooperates with a cam 1365 on the rear drive shaft 110. (See particularly FIG. 22 where the upper and lower parts of the lever 1360 are shown separate.) The upper end of lever 1360 has an ear 1368 which cooperates with the cam 1355. When the counter ratchet wheel 1190 contains a "0," it holds the cam 1355 in the position shown in FIG. 28 for blocking the spring-urged, counter-clockwise rotation of the arm 1360. When the counter ratchet wheel contains a "1," or larger digit, the cam 1355 is dropped to a position, such as that shown in FIG. 40, to bring a notch 1369 into alignment with ear 1368 for permitting the arm 1360 to swing.

Arm 1360 is also provided with a latch 1370 (FIGS. 22 and 24). The function of this latch is to hold the lever 1360 in such position that the ear 1368 is clear of the cam 1355, so that the cam 1355 will be free to drop when the ratchet wheel is released for the first time at the very beginning of the multiplication operation. As may be seen in FIG. 25, a roller 1371 on the cam 1365 lifts the latch 1370 as soon as the machine begins to operate. Then during the entire multiplication operation, the tail of the trident latch 1326 bears against a pin 1372, as shown in FIG. 40, and holds latch 1370 clear of lever 1360.

4. Digitation set

Thus during the entire multiplication operation, the arm 1360 swings under control of the cam 1365, except when it is blocked by the cam 1355, that is, when there is a "0" in the counter ratchet wheel 1190. Each time the lever 1360 swings counter-clockwise to the position shown in FIG. 40, it sets the add-subtract shaft 696 which extends through the machine (FIG. 4) for controlling entries into the accumulator. The add-subtract shaft sets the machine for digitation; that is, for the entry or counting of the digits (from the selector in this instance) by the actuator into the orders of the accumulator. Pinned at 1375 (FIG. 40) to the lever 1360 is a link 1376. The forward end of this link has a slot 1377 which embraces a pin 1378 that guides the motion of the link 1376. This pin 1378 is supported on a reversing lever 1385 (FIG. 26) which, as will be explained, holds the pin 1378 in one or the other of two positions shown, for example, in FIG. 42. In FIG. 40 the pin 1378 is shown in solid lines in its lower position. Under this condition when the link 1376 is moved forward by the lever 1360, two pins 1379 and 1380 on a depending arm of the link 1376 abut a lever 1381 which is fixed to the plus-minus shaft 696, for turning that shaft to the plus position *b* shown in solid lines in FIG. 40, that is, the position for causing entries to be made additively into the accumulator. When the pin 1378 is held in its upper position, shown in dotted lines 1378-*a* in FIG. 40, the forward motion of link 1376 sets the shaft 696 for a subtractive entry, as shown in FIG. 41. The lower pin 1380 abuts the lever 1381 and the upper pin 1379 abuts a short link 1382 which has a pin-and-slot connection with the lever 1381, as shown in FIG. 41. The home, plus, and minus positions of lever 1381 are indicated in FIG. 40 at *a*, *b* and *c*, respectively. Thus, early in each cycle, if the counter ratchet wheel 1190 does not contain a "0," the lever 1360 (FIG. 40) moves the link 1376 forward (right in FIG. 40) for rocking the shaft 696 for setting the machine for either an additive or a subtractive entry of the multiplicand into the accumulator.

5. Digitation sign control

The reversing lever 1385 is a bail formation. The right-hand part rocks on pin 1384, as shown in FIGS. 26 and 42, and the left-hand part (not shown) rocks on a pin aligned with pin 1384. The rocked position of this reversing lever is controlled by a link 1387, the upper end of which is connected to the bail 1214 which controls the test for selected sign or inverse entries (short-cut test). The lower end of this link 1387 carries a pin 1388 (FIG. 42) which is embraced by a slot 1389 in the lever 1385. The link 1387 can be swung for placing the pin 1388 in either the forward or rear end of the slot 1389.

Normally the link 1387 is in a rear position, as shown in FIG. 42, and it remains in that position during a positive multiplication operation initiated by the multiplication (=) key 38 (FIG. 51). As was previously explained, if a value from "0" to "4" is in the storage sector 970 of the memory unit, the flange 1160 (FIGS. 42 and 9) of the short-cut test lever 1213 will abut the step 1161 of the storage sector, so that the lever 1213 and the bail 1214 will occupy the position shown in solid lines in FIG. 42. Under this condition the reversing lever 1385 will occupy the position shown in solid lines in FIG. 42 for holding the pin 1378 in its lower, or "plus," position for an additive entry, as was explained in connection with FIG. 40. If the storage sector of the memory unit contains a number from "5" to "9," the lever 1213 will drop, as indicated by the dotted lines in FIG. 42, thereby lowering the link 1387 and rocking the reversing lever 1385 to the dotted position shown in FIG. 42 for causing the mechanism of FIG. 40 to set the accumulator for a subtractive entry, as shown in FIG. 41.

A negative multiplication (− =) key 40 (FIG. 53) causes a product to be entered subtractively into the accumulator. In this operation, selected-sign entries are negative and inverse entries are positive. Depression of the key 40, among other things, swings the link 1387 forward to the position shown in FIG. 43. This forward movement of the link 1387 and its pin 1388 rocks the reversing lever 1385 to place the pin 1378 in its upper position and also places the pin 1388 on the forward side of the journal 1384 of the reversing lever. Under this condition, a number from "0" to "4" in the storage sector causes a subtractive entry into the accumulator, and a number from "5" to "9" permits the bail 1214 to drop and swing the reversing lever 1385 to the dotted position in FIG. 43 for putting the pin 1378 in its lower position and causing the link 1376 to set the shaft 696 for an additive entry.

6. *Multiplier key and multiplier bar 1050*

The multiplication control link or "equals bar" 1050 appears in its normal position in FIGS. 29 and 51. In FIG. 51, the multiplier key 38 includes a stem 1401 which carries a spring-urged overload cam 1402. The initial slight depression of the key 38, through the cam 1402, rocks a lever 1404 against a light spring 1405, and draws the bar 1050 forward slightly. This slight forward motion, through pin 1049, rocks the bail 1060 (FIGS. 22 and 8), which, in turn, rocks the bail 1068 for making an over-capacity test described in the applications previously referred to. If there are too many orders in the multiplier and multiplicand, slide 1066 (FIG. 1) will be stopped by the end 1067 of a detent lever 1055 and will block the forward motion of the equals bar (=) 1050 (FIG. 22) before any other control actions are performed. Accordingly, with bar 1050 blocked, overload cam 1402 (FIG. 51) is rocked and key 38 is depressed without initiating the multiplication operation. This depression of key 38 (FIG. 51), through a pin 1430, actuates the clutch bar (not shown), and a machine cycle is started. As described in the copending applications Serial Nos. 138,645 and 117,096, previously referred to, the actuation of only the clutch control causes a print-only operation which clears the selector unit.

If bar 1050 is not blocked by the over-capacity test, movement of lever 1404 (FIG. 51) continues. Also journalled on the pin 1403 is a depending hook 1406 which has a lost motion connection at 1407 with the lever 1404. A light spring 1414 holds hook 1406 in engagement with a pin 1411 on a lever 1408 during the over-capacity test. The initial motion of lever 1404 beyond the over-capacity test swings this hook for releasing the lever 1408, which is loaded by a heavy spring 1409. Upon this release, the spring 1409 rocks the lever clockwise in this figure and pulls the equals bar 1050 forward. This action of spring 1409, through lever 1404 and a pin 1410, drives the key 38 to its fully depressed condition. This action of key 38 through the pin 1430, actuates the clutch bar (not shown) for initiating machine operation. Also, a pin 1412 on the lever 1408 depresses tongue 1413 of a lever 944 for setting the machine for repeat operation, as in the application previously referred to. However, this action of spring 1409 in driving bar 1050 forward also causes the initial test of the multiplier storage unit, and makes the initial settings of the multiplication controls.

Referring to FIG. 44, the stop pawl 1309 includes a tail portion 1415 that carries a pin 1416 which, in home position, lies in front of an ear 1417 (FIG. 45) on the equals bar 1050. When the bar 1050 is driven forward by spring 1409 (FIG. 51), ear 1417 abuts pin 1416 and rocks the stop pawl 1309 for disengaging the ratchet wheel 1190 (FIG. 45) so that, as previously described the spring 1307 (FIG. 22) moves the digit sensor 1150 (FIG. 9) into engagement with the storage sector 970.

The full forward motion of bar 1050 also causes pin 1049 (FIG. 29) to rock the bail 1060, which, in turn rocks the bail 1063 (FIG. 8) for blocking the detent levers 1055 (FIG. 1) and preventing any changes in the settings of the storage sectors 970 during multiplication as was described.

Shortly before the end of the multiplication operation the bar 1050 (FIG. 51) is driven rearward, as will be explained. This action rocks the lever 1404 counterclockwise, causing the pin 1410 to rock the overload cam 1402, because at this time the key 38 is still locked down by engagement of the clutch bar with pin 1430, as described in the applications Serial Nos. 138,645 and 117,096, previously referred to. The lost motion connection 1407 permits the latch 1406 to reengage the pin 1411.

7. *Main multiplication lever 1322*

The spring-driven forward motion of the equals bar 1050 also drives a pin 1421 (FIG. 44) against an edge 1422 of the main multiplication lever 1322 for rocking it from the position shown in FIG. 44 to that shown in FIG. 45. This motion causes the hook 1321 to release the pin 1320 on the poker carrying lever 1313 (FIGS. 27 and 25) and also brings the lever 1322 close to an ear 1423 of the trident latch 1326 (FIG. 23) and brings a tail 1432 close to a pin 1424 on the slide 1050. The action also brings a cam face 1325 at the lower edge of the lever 1322 into the path of a pin 1426 on the cam 1315.

The forward movement of the equals bar 1050 driven by spring 1409 (FIG. 51) put the parts in the position shown in FIG. 45 and sets the machine into operation. Early in the first cycle, the pin 1426 (FIG. 45) drives against the cam surface 1325 and rocks the lever 1322 to the position shown in FIG. 46. This action causes the tail 1432 of the lever 1322 to lift the pin 1424 for raising the bar 1050, and this lifting of the bar 1050 raises the ear 1417 above the pin 1416 for releasing the stop pawl 1309 for re-engagement with ratchet wheel 1190 for the ratchet feed operation, as described in connection with FIGS. 24 and 32. The lever 1322 also drives ear 1423 rearward for rocking the trident latch 1326, as previously mentioned, for example, in connection with FIGS. 33 and 40. A spring-urged latch 1434 (FIGS. 46 and 30) engages the lever 1322 for holding it in this operative position, and will continue to hold it there until released by a successful termination test for ending the multiplication. The equals bar 1050 (FIG. 45) includes a notch 1439 which embraces the ear 1269 of the lever 1267 (FIG. 51) which controls the clutch for connecting the two carriages during the multiplication operation, as previously described (FIGS. 7 and 52).

Thus, depression of the multiplication (=) key 38 tests for over-capacity, sets blocking bail 1063, releases the counter ratchet wheel 1190, locks the two carriages together, sets the multiplication lever 1322 and the trident latch 1326, sets the machine for repeat operation, and starts the machine operating.

At the end of the multiplication operation the successful termination test (FIG. 47), as will be described, locks the latch 1434 (FIG. 46) and releases the multiplication control lever 1322. This action releases the trident latch 1326, as previously mentioned, and also causes the bar 1050 to drop, urged by a spring 1437, below its normal position of FIG. 44. As shown in FIG. 8, this action is timed to occur when the bail 1314 is forward so that a shoulder 1436 on the bar 1050 drops behind the bail 1314. At the same time, a notch 1438 in the bar 1050 drops over an ear 1440 (FIGS. 48 and 51) at the upper end of a lever 1441 journaled at its lower end at 1442. This lever is connected by a movable pin 1443 to a lever 1444 fixed to the shaft 560 which extends through the machine for controlling the total and subtotal operations (FIG. 4) as previously described. With the parts thus in the position shown in FIG. 48 during the last portion of the last cycle in the multiplication operation, the cam 1315 drives the bail 1314 rearward for thereby driving the bar 1050 rearward and leaving it is the position shown in FIG. 49, behind and below its home position. During this reward motion of bar 1050, ear 1417 has passed under pin 1416 of stop pawl 1309. At the same time, the rocking of bail 1314, and with it the arm 1313 (FIG. 27), has swung the pin 1320 into position to be relatched by the hook 1321 of the 1322. Thus these parts are in the position of FIG. 49 at the end of the last cycle of the multiplication. The action of resetting them to their home positions will be completed during a single print-out (total-taking or subtotal taking) cycle which follows immediately. With the pin 1443 in its lower position, as shown in FIG. 49, the rocking of lever 1441, by the rearward movement of bar 1050, has set the accumulator for a total-taking operation which the machine immediately begins. If the pin 1442 had been in its upper position shown in FIG. 50, the rocking of the lever 1441 would have produced a greater angular movement of the lever 1444 for causing the last operation to be a subtotal operation. As is explained in the copending applications Serial Nos. 138,645 and 117,096 previously referred to, pin 1443 is moved by the depression of an accumulate multiplication (= S) key not shown here. As the machine goes through its final cycle for taking the total or subtotal, pin 1426 (FIG. 49) on cam 1315 engages the curved undersurface 1448 of the bar 1050 and lifts it so that shoulder 1436 clears the bail 1314, and spring 1409 (FIG. 51) pulls the bar 1050 forward to its home position, shown, for example, in FIG. 44.

8. Counter overstroke and termination test

As the pawl 1335 (for example, FIG. 33) turns the ratchet wheel 1190 for the last count in an order, it carries the ratchet wheel through its "0" position into an overstroke position shown in FIG. 39. This action has already been mentioned in connection with lifting the poker 1312 to its home position (FIG. 36). This counter overstroke, through the gear 1187 (FIGS. 14 and 16), drives the digit sensor 1148 rearward for driving the abutment 1224 against the pin 1223, or the latch projection 1222 against the ear 1221, for setting the sensor at carry or no-carry, respectively, for the next order. The counter overstroke, through pin 1329 (FIG. 39) also lifts the block cam 1355 as shown in that figure, so that a pin 1451 lifts a latch 1452 (see also FIGS. 29 and 51), which is journalled at 1453 and at its rear end engages a pin 1454 of the bail arm 1246. This release of the pin 1454 drops the bail 1244 for making the termination test, as previously described in connection with FIG. 17.

The forward, lower end of latch 1452 is pinned at 1455 to a shift link 1456 (FIGS. 22, 29 and 53). As shown in FIG. 53, link 1456 is pinned at 1457 at its forward end to a bellcrank 1458 journalled at 1459. This bellcrank has a lost motion connection comprising a pin 1460 and an aperture 1461, with a second bellcrank 1462 also journalled at 1495. A pin 1463 in the bellcrank 1462 underlies an ear 228 on the shift arm 226 of the selector mechanism, previously mentioned herein and more fully described in the copending applications Serial Nos. 138,645 and 117,096 previously referred to. The lost motion connection 1461, 1460 and the spring 1466 permit the mechanism to yield so that the operation of the multiplication mechanism cannot be jammed if the lever 226 is blocked. A spring 225 of the shift lever 226 normally urges the link 1456 forward and the latch 1452 (FIGS. 29 and 51) into engagement with the pin 1454. This lifting of the lever 226 in FIG. 53 partially operates the selector escapement, as described in said copending applications, but the shift of the selector carriage will not be complete until the lever 226 drops again. The dimension of the feeler blade 1165 (FIG. 17) is chosen to properly make the termination test with the bar 226 in its raised position.

In FIG. 29, the release of the lever arm 1246 by the latch 1452 drops the bail 1244 for making the termination test, previously described in connection with FIG. 17. If the bail 1244 is prevented from dropping to its lowest position, shown in solid lines in FIG. 17, this bail 1244 does not initiate any change of action. But if it does drop to its lowest position, as shown in FIG. 47, thereby indicating that multiplication has been completed, a forward extending arm 1740 of the lever 1246 strikes a pin 1471 on the latch 1434 for releasing the main multiplication control lever 1322, as previously described.

Next, the feed pawl 1335 (FIG. 32) is swung forward, permitting the counter ratchet wheel 1190 to move from its overstroke (FIG. 39) to its home position (FIG. 38) for lowering the cam 1355 and the latch 1452 (FIG. 51). This lowering of latch 1452 moves the shift link 1456 forward and lowers the arm 226 (FIG. 53). This action permits the selector unit to complete its shift, and because the selector and sensor carriages are connected by the clutch 1264, 1265 (FIGS. 7 and 52), the sensor carriage moves one order to the left to bring the sensors in line with the storage sector 970 of the next highest order of the multiplier.

Next, a roller 1474 on the cam 1315 (FIG. 31) rocks a lever 1472 clockwise in FIG. 31 about its journal 1473 against a down-extending arm 1475 of the lever 1246. This action not only returns the lever 1246 to its home position, where it is again caught by latch lever 1452 (FIG. 29), but drives it beyond to its overstroke position 1244–b in FIG. 17 so that the bail 1244 moves the latch 1233 (FIG. 15) for releasing the link 1218 and permitting that link and the lever 1216 to return to their home position in readiness for the next short-out test. Although the latch 1233 thus releases the link 1218 in the second half of each machine cycle, this action is of significance only during the last cycle in an order during which inverse entries were made. At other times the position of link 1218 will be controlled by the lever 1213 (FIG. 9).

VII. EXAMPLE OF MULTIPLICATION (MULTIPLIER 4950)

The general pattern of the automatic multiplication program consists of digitation and counter feed in the first half of each machine cycle, and the setting of the digitation controls during the second half-cycle. For the digitation in the initial cycle, the controls are set before the machine starts, and for each subsequent cycle, they are set during the last half of the preceding cycle. In addition, during the last cycle of each order, the counter overstroke occurs near mid-cycle for shifting the carriages and making the termination test before the multiplier is sensed and the controls set for the next cycle. A successful termination test marks the last digitation cycle, and during the last half of that cycle the controls are set for print-out in the next and final cycle, during which the homing of the controls is completed.

For an example of multiplication, assume that the number "4950" is contained in the four lowest, or right-hand, orders of the multiplier storage, or memory unit, and assume that the number "11,111" is contained in the selector unit. The multiplication operation is initiated by depression of the multiplication, or equals (=) key 38 (FIG. 51). The initial slight motion of this key, acting through overload detent 1402 (FIG. 51) and bellcrank 1404, draws the multiplication control bar 1050 forward, as shown, for example, in FIG. 29. The pin 1049 in the link 1050 rocks the bails 1060 and 1066 (FIG. 8) for the over-capacity test. Since, in this example, the total number of orders in the multiplier and multiplicand does not exceed seventeen, the motion of the blade 1066 will be unobstructed so that the multiplication bar 1050 (FIG. 51) moves forward. Continued manual depression of the key 38 disengages hook 1406 from the pin 1411 so that the spring 1409 rocks the lever 1408 and snaps the link 1050 to its extreme forward position.

1. Intial setting of controls

The rocking of the lever 1408 has caused pin 1412 (FIG. 51) to rock the lever arm 944 to set the machine for repeat operation, as previously explained. The forward motion of the bar 1050, under force of the spring 1409, has also rocked the stop pawl 1309 (FIG. 45) to release the counter ratchet wheel 1190, has rocked the main multiplication control lever 1322 to the position shown in that figure, and has set bail 1063 (FIGS. 8 and 1) to block the detent levers 1055. The release of the counter wheel 1190 has permitted the spring 1307 (FIG. 22) to rotate the shaft 1189 (counter-clockwise in FIG. 10). The ratchet wheel 1190 is free to turn because its drive pawl 1335 is held clear by the trident latch 1326, as in FIG. 24. Since this lowest order of the multiplier contains a "0" in this example, the sector 970 is in the position shown in FIG. 10, and the tongue probe 1152 being in its no-carry position, has stopped against the step 1153. The probe 1150 of the digit tester in sensing a "0" with no-carry has permitted the ratchet wheel 1190 to turn only a fraction of a tooth space to the position shown in FIG. 10. Pin 1329 (FIG. 28) on the ratchet wheel has dropped the block cam 1355 far enough to drop bail 1214 for the short-cut test (FIG. 51) but not far enough to unblock the digitation control lever 1360.

The initial rocking of the lever 1322 (FIG. 45) by the forward movement of bar 1050 has released the pin 1320, which, as shown for example in FIG. 27, is on the lever 1313, so that the bail 1314 is free to follow its cam 1315. This action has also brought the cam face 1325 of the lever 1322 (FIG. 45) into the path of the pin 1326 on the cam 1315.

The forward motion of the equals bar 1050 has also swung the lever 1267 (FIG. 51) and engaged the clutch 1264, 1265 (FIG. 52) for connecting the selector carriage to the sensor carriage.

2. Initial half-cycle (multiplier digit "0")

The action thus far has taken place substantially before the start of the machine cycle. The depression of the key 38 (FIG. 51), through the pin 1430, has also moved the clutch bar for engaging the clutch and energizing the motor, as previously described. The initial rotation of cam 1315 (FIG. 51) brings the pin 1426 (FIGS. 45 and 46) against the cam face 1325 of the lever 1322 and swings it to the position shown in FIG. 46. The latch 1434 catches and holds the lever 1322. The tail 1432 of that lever lifts against the pin 1424 for raising the multiplication bar 1050 so that the ear 1417 disengages the pin 1416 of the stop pawl 1309 and permits the pawl to re-engage the counter ratchet wheel 1190.

The rocking of the lever 1322 (FIG. 46), through ear 1423, also rocks the trident latch 1326 to the position shown in FIGS. 32 and 38. This movement of the trident latch releases the counter drive arm 1338 so that it swings to the position shown in FIG. 32. The trident 1326 also strikes the pin 1327 for releasing the latch 1317 (FIG. 38), so that the poker 1312 falls until its arm 1328 rests on pin 1329, as shown in FIG. 38. The initial rotation of the machine has also caused the pin 1371 (FIG. 25) to lift the latch 1370 for releasing the arm 1360. The tail of the trident latch 1326 engages the pin 1372, as shown in FIG. 40, and holds the latch up for the duration of the multiplication operation. With a "0" in the counter ratchet wheel 1190, and the lever 1360 (FIG. 28) blocked by the cam 1355, link 1376 (FIG. 40) will not be moved and consequently the arm 1381 will not be set for any entries into the accumulator.

3. Mid-cycle; counter overstroke

At about mid-cycle, cam 1340 rocks the arm 1338 (counter-clockwise in FIG. 32) and carries counter ratchet wheel 1190 to its overstroke position shown in FIG. 39. This action lifts the latch 1452 and pulls the shift link 1456 rearward (FIG. 53) to rock arm 226 and perform the partial shift of the carriages. The lifting of the latch 1452 (FIG. 39) also releases the pin 1454 and the bail 1244 (FIG. 29) for making the termination test. Blade 1165 (FIG. 17) will find the storage discs 970 of the second, third and fourth orders out of their "0" positions and no action will result from the test.

4. Second half of first cycle: Shifting, testing next order (Digit "5," "no-carry"), setting controls At about the three-quarter cycle position, the cam 1340 (FIG. 32) passes the roller 1339 and spring 1341 swings arm 1338 clockwise, permitting the ratchet wheel 1190 to return from its overstroke position (FIG. 39) to its home position (FIG. 38) where it is stopped by the stop pawl 1309. Since the trident latch 1326 still rests against pin 1327 (FIG. 38), latch 1317 is held clear of the pin 1318 so that the poker 1312, under control of the pin 1329 on the ratchet wheel, drops to the position shown in FIG. 38, in alignment with the pin 1316 on the stop pawl 1309. The return of the ratchet wheel 1190 from its overstroke to its home position also drops the latch 1452 (FIG. 39) and moves the shift link 1456 (FIG. 53) forward for completing the shift of the selector unit and with it the sensor carriage of the multiplier. The shifting of the selector changes the number therein to "111,110" for use with the second order of the multiplier.

Next, the roller 1474 (FIG. 31) on the cam 1315 rocks the lever 1472 for rocking the lever 1246, carrying the termination test bail 1244 to its reset-overstroke position 1244–b in FIG. 17 for releasing the latch 1213 (which action accomplishes nothing in this instance), and then lets the bail 1244 return to its home position where it is held by the latch 1452 (FIG. 30).

At about this same time the notch in cam 1315 comes under the roller 1319 on the bail 1314 (FIG. 38) and lets it swing (counter-clockwise in this figure) for driving the poker 1312 against the pin 1316 and releasing the counter ratchet wheel 1190. It will be recalled that, at this point, about three-quarters of the way through the cycle, the carriages are already shifted so that the sensors (FIG. 9) are aligned with the storage sector 970 of the second order of the storage unit. Accordingly, this release of the ratchet wheel 1190 lets the spring 1307 (FIG. 22) drive the probe 1150 (FIG. 9) toward the sector 970 of the second order (which contains a "5"), and since lever 1195 is at no-carry, the parts assume the position shown in FIG. 12. At the same time, the pin 1329 on the ratchet wheel 1190 drops the block cam 1355

(FIG. 28), the lever 1360 at this point being held free of the cam 1355 by the cam 1365. The dropping of the block cam 1355 drops the bail 1214 for the short-cut test, and the lever 1213 drops to the "5" to "9," or inverse position, shown, for example, in dotted lines in FIG. 42, for rocking the bail 1385 to the negative entry position, also shown dotted in FIG. 42.

Near the end of this cycle, still the first cycle of operation, cam 1315 (FIG. 38) again swings lever 1313 (clockwise in this figure) for disengaging the poker 1312 from the pin 1316, thereby leaving the stop pawl 1309 free. Since the ratchet wheel 1190 will have rotated five units (clockwise in this figure), the pin 1329 lies well below the arm 1328 and permits the poker 1312 to drop to the position shown in FIG. 37 for missing the pin 1316. Also just before the end of this first cycle, the notch in cam 1365 comes under roller 1363 (FIG. 40) and permits the arm 1360 to be driven by its spring 1362 (counter-clockwise) for setting the lever 1381 for a subtractive entry into the accumulator as shown in FIG. 41.

5. Four cycles of second order

During the first half of the first cycle in the second order, the number "111,110" in the selector will be entered subtractively into the accumulator. Although the cam 1365 (FIG. 40) withdraws the link 1376 shortly after the beginning of the cycle, the subtraction operation once initiated is locked in by mechanism described in the apppli-cations previously referred to.

Near mid-cycle the cam 1340 rocks the arm 1338 (counter-clockwise in FIG. 32) so that pawl 1335 drives the ratchet wheel 1190 (counter-clockwise in this figure) about one and one-half notches so that one tooth clicks under the stop pawl 1309. As the arm 1338 returns (clockwise in FIG. 32) it leaves the counter wheel with a count of "4." Pin 1329 on the ratchet wheel 1190 does not come into operation during this cycle.

Later in the cycle, roller 1474 (FIG. 31) rocks the lever 1472, and through lever 1246, moves the termination test bail 1244 to its reset-overstroke position, shown at 124–*b* in FIG. 17, so that the latch 1233 releases the link 1218 (FIG. 15). However, the link 1218 is still held in its upper position by the lever 1213, which still is in the dotted position shown in FIG. 42. Consequently as the roller 1474 passes the lever 1472 (FIG. 31), the latch 1233 is restored for holding the link 1218 (FIG. 15) in its upper position. The latch 1452 for the lever 1246 and bail 1244 (FIG. 30) is not lifted during this cycle. Just before the end of the cycle, the notch of cam 1315 lets the lever 1313 swing (counter-clockwise in FIGS. 37 and 38), but because the counter wheel 1190 is not in its "0" position, pin 1329 does not support the arm 1328, and consequently the poker 1312 lies below the pin 1316, as shown in FIG. 37, and has no effect.

Also, just before the end of this cycle, the notch of cam 1365 (FIG. 40) releases the arm 1360. Since the block cam 1355 is still in its lower position, digitation-set arm 1360 swings (counter-clockwise in this view) for setting the add-subtract lever 1381 for the next cycle. Since the lever 1213 is still in its lower position (FIG. 42), this action sets the lever 1381 for another subtractive entry, as shown in FIG. 41.

The second, third and fourth cycles in the second order are substantially similar to the first, the counter wheel 1190 being advanced to its "3," "2" and "1" positions in succession and the quantity "111,110" being entered into the accumulator subtractively during each cycle. The machine similarly enters the fifth cycle of the second order with the add-subtract lever 1381 set for subtraction.

6. Fifth cycle of second order

In the fifth cycle of the second order, the counter feed pawl 1335 (FIG. 32) drives the counter wheel 1190 from its "1" position (for example, FIG. 37) through its "0" position to its overstroke position shown in FIG. 39. As in the first order, this overstroke causes the pin 1329 to lift cam 1355 which, through pin 1451, lifts the termination test latch 1452. This action drops the termination test bail 1244 (see also FIG. 17) but since the higher orders of the register contain values other than "0" and since the hook 1216 is in its lower position 1216–*a*, the bail 1244 is not permitted to fall to its lower position and consequently the test does not initiate any action. The lifting of the cam 1355 also lifts the short-cut test lever 1213 to a position above its home position, and clear of the lever 1216, but the link 1218 and the lever 1216 are still held in their carry position by the latch 1233 (FIG. 14). The overstroke of the ratchet wheel 1190, through gear 1187, also carries the digit tester 1148 to its overstroke position (extreme right in FIG. 14) and brings abutment 1224 against the pin 1223 which, at this time, is in the carry position 1223–*a*, shown dotted. This action lifts arm 1195 into the carry position, as shown in FIG. 16, where it is latched by the pin 1205. The counter overstroke also carries the poker 1312 to its uppermost position (FIG. 39) but the trident latch 1326 still obstructs the pin 1327 (FIG. 38) and prevents the latch 1317 from setting. As previously explained, the counter overstroke also pulls the shift link 1456 (FIG. 53) forward.

As the high part of cam 1340 leaves the roller 1339, the drive pawl 1335 is swung to the right in FIG. 32 and clear of the ratchet wheel 1190. This action permits the wheel 1190 to return to its home position (where it is caught by the stop pawl 1309) so that the latch 1452 is dropped to complete the shift of the selector carriage and with it the multiplication test carriage. It is to be noted that at the time of shift, the short-cut test lever 1213 is in its home position and, therefore, clear of the storage sectors of the memory unit, and also that the digit tester is in its home position, as shown in FIG. 9, and clear of the memory sectors. The blade 1165 of the termination tester may be engaging one or more of the memory sectors but simply slides across them. The shifting of the selector adds another "0" to the number therein.

Next, roller 1474 (FIG. 31) engages the lever 1472 for restoring the termination test lever 1246 and bail 1244, and for carrying the bail 1244 to its overstroke position 1244–*b* where, as seen in FIG. 17, it rocks the latch 1233 for releasing link 1218. Thereupon, this link and lever 1216 return to their normal no-carry position (shown in FIG. 9 and shown in solid lines in FIG. 14) in preparation for the next short-cut test. Next the poker 1312 (FIG. 38) swings against the pin 1316 of the stop pawl 1309 and releases the counter ratchet wheel 1190. The digit tester 1148 (FIG. 9) is now in alignment with the third order of the storage unit, which, in the present example, contains a "9," and since the lever 1195 is in its carry position as shown in FIG. 13, the digit tester and the counter wheel 1190 are stopped in the "0" position. As previously explained, this "0" position of the counter holds the block cam 1355 far enough below the position of "home" to drop the lever 1213 for making the short-cut test. Since the storage sector contains a "9," the lever 1213 drops to the lower, dotted-line position in FIG. 42, thereby rocking the lever 1216 (FIGS. 9 and 14) and lifting the link 1218, which are then latched in their carry position by the latch 1233. Although the cam 1355 dropped enough to drop the bail 1214 and the lever 1213, it did not drop enough to permit the ear 1368 of lever 1360 (FIGS. 28 and 40) to enter the notch 1369. Consequently, the lever 1381 (FIG. 40) is not set and no entry will be made in the accumulator during the next cycle.

7. Third order (digit "9" with carry)

During the next cycle, the only cycle in the third order, the cam 1340 (FIG. 32), through the pawl 1335, again drives the counter ratchet wheel 1190 to its overstroke position and then releases it to its home position for actuating the shift link 1456 and releasing the termination test bail 1244. Again the counter overstroke drives the digit tester 1148 (to the right in FIG. 14), bringing the abutment 1224 against the pin 1223 in its carry position 1223-a for setting lever 1195 to carry. Again the carriages are shifted and again the termination test bail 1244 is lifted and driven to overstroke for releasing the latch 1233 (FIG. 17) to prepare lever 1216 and link 1218 for the short-cut test for the next order.

With the machine still in the single cycle of the third order, but with the sensor carriage aligned with the fourth-order storage sector 970, the cam 1315 (FIG. 38) drives the poker 1312 against the pin 1316 for releasing the counter ratchet wheel 1190 for the digit test. Because the digit now being tested is a "4" and because the arm 1195 is set at carry (as in FIG. 11), the ratchet wheel 1190 runs to its extreme, or number "5" position. Again the digitation block cam 1355 (FIG. 40) is dropped to permit operation of the lever 1360, and to drop the bail 1214 so that the lever 1213 (FIG. 42) makes the short-cut test. Since the number in the sector 970 is a "4," the lever 1213 is stopped in the "selected sign" position, shown in solid lines in FIG. 42, so that reversing lever 1385 is left in the position for a positive entry. Finally just before the end of the cycle, still the last cycle of the third order, cam 1365 lets lever 1360 swing (counter-clockwise in FIG. 40) for setting the lever 1381 for a positive entry, as shown in that figure.

8. *Fourth order (digit "4" with carry), termination test*

Accordingly, during the first cycle in the fourth order, the machine enters the numbers "11,111,000" additively into the accumulator, the counter ratchet wheel 1190 is advanced one notch, and at the end of the cycle, the lever 1360 again sets the lever 1381 (FIG. 40) for the next cycle, and similarly in the second, third and fourth cycles.

During the fifth cycle in this order, the pawl 1335 (FIG. 32) carries the counter ratchet wheel 1190 through its home position to overstroke (FIG. 39), again lifting the latch 1452 for causing the shift and for dropping the termination test bail 1244. This time, all higher orders are at "0" and the lever 1216 (FIG. 9) is in its upper position, so bail 1244 and blade 1165 drop to their lowest position, as shown in FIG. 17. As shown in FIG. 47, this action causes the tail 1470 of the lever 1246 to strike the pin 1471 on the latch 1434 for releasing the main multiplication lever 1322, which thereupon swings from the position shown in FIG. 46 to that in FIG. 48. It cannot yet swing to home position (shown in FIG. 29) because it is obstructed by the pin 1320 on the lever 1313 (FIG. 27), because with the cam 1315 in the position shown in FIG. 48, that lever, and its bail 1314, are out of their home position. This action also releases the trident latch 1326, which, under the force of its spring, moves to the position shown in FIG. 33 so that the drive pawl 1335 will be lifted and the lever 1338 latched in home position, as was described in connection with FIGS. 33, 34 and 35. The release of the trident latch 1326 moves it away from pin 1327 (FIG. 38) and leaves latch 1317 free to catch above the pin 1318 (FIG. 25). The release of the trident latch 1326 also frees the latch 1370 (FIG. 40), which will now be free to alternately engage and release the lever 1360 during each cycle. However, lever 1360 cannot again set the add-subtract lever 1381 (FIG. 40), because it is blocked by cam 1355.

The counter overstroke has also moved the digit tester (to the right in FIG. 14) and brought the prong 1222 of the latch 1203 against the ear 1221 (now in its normal, or full line, position in FIG. 14), thereby causing the arm 1195 to return to its no-carry, or home, position in readiness for the beginning of the next multiplication operation.

The partial return of the multiplication lever 1322 (to the position of FIG. 48) causes the multiplication bar 1050 to drop under force of its spring 1437 and causes notch 1438 to drop over the ear 1440 of the print-out lever 1441 (see also FIG. 51). It also causes the ear 1436 (FIG. 48) at the rear end of the bar 1050 to drop over the bail 1314.

Then as the cam 1315, at the very end of the last cycle in the fourth order, drives the bail 1314 rearward (to the left in FIG. 48), the bail 1314 carries the bar 1050 rearward to an overstroke position and rocks the lever 1441 to the position shown in FIG. 49. This action, through the pin 1443, rocks the lever 1444 on the total-subtotal shaft 560 and sets the machine for a total-taking cycle.

The rearward motion of bar 1050 to the overstroke position forces the levers 1404 and 1408 (FIG. 51) past their normal positions so that the hook 1406 easily engages under the pin 1411. Because the key 38 (FIG. 51) is still latched down by the clutch bar as described in the copending applications Serial Nos. 138,645 and 117,096 previously referred to, this return of lever 1404 causes a rocking of overload cam 1402. The restoration of the lever 1408 also, through pin 1412, returns the repeat controls to normal. This restoration of the repeat control to normal comes too late to terminate the machine operation in this, the last cycle in the last order of the multiplication, but it will cause termination at the end of the next, the total-taking cycle. Restoration of the link 1050 also, through lever 1267 (FIG. 51), disengages the carriage clutch 1264, 1265 (FIG. 52).

9. *Print-out cycle, homing the controls*

The machine now goes into a total-taking cycle for reading the total out of the accumulator and printing it, returning the selector to home (where it is cleared) by means of the mechanism shown in FIG. 7, and also returning the multiplier sensor carriage 1194 to its extreme right-hand, or home position. During the total-taking cycle, the cam 1340 rocks the lever 1338 for moving it from the position shown in FIG. 35 to that shown in FIG. 23 where it is latched by the trident 1326. Although the rearward movement of the multiplication bar 1050 at the end of the last multiplication cycle caused the arm 1313 and bail 1314 to be latched at home position by the pin 1320, as shown in FIG. 49, the bar 1050 is still below, and to the rear of, its home position. Near the end of the total-taking cycle, roller 1326 on the cam 1315 runs under the edge 1448 of the bar 1050 and lifts it so that the shoulder 1436 rises above the bail 1314 and the bar moves forward slightly under the force of the spring 1409 (FIG. 51) into its home position, shown in FIGS. 28 and 44.

Thus the multiplication of "11,111" by "4950" has been accomplished by subtractively entering "111,110" five times, and additively entering "11,111,000" five times to get "54,999,450," the correct product.

VIII. NEGATIVE MULTIPLICATION

The negative multiplication, or "negative equals" (−=) key 40 (FIG. 53) has a key stem 1501 which carries a pin 1502 which overlies a bar 1503 (FIG. 51) on the stem of the multiplication, or equals (=) key 38. Consequently, depression of key 40 depresses also the multiplication key 38 for causing the complete multiplication operation, as just described. However, key stem 1501 also has a pin 1505 (FIG. 53) which lies in the slot 1506 of a bellcrank 1507 journalled at 1508. At its upper end the bellcrank 1507 is pinned at 1509 to the negative multiplication link 1510, the rear end of which is connected to the link 1387 (see also FIGS. 42 and 43). Accordingly, depression of the negative equals key 40 moves the link 1387 forward. As was previously explained in connection with FIGS. 42 and 43, movement of the link 1387 to its forward position reverses the position of lever 1385 with respect to the selected-sign and inverse control of the short-cut test lever 1213. Consequently, the negative equals operation modifies the multilication operation by causing selected sign entries to be subtractive and inverse entries to be additive, so that the product is entered in the accumulator subtractively.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. In combination in a calculating machine, power means for operating said machine in cycles, an accumulator, means for entering digitation therein in the early part of the machine cycle, a multiplication-setting bar in said machine having a home position and movable therefrom to an operative position for initiating power operation of said machine, movable driving means having a home position and spring-biased therefrom for driving said bar to said operative position, a latch biased into engagement with said driving means for holding it in its home position for preventing it from so driving said bar, means providing a lost motion connection between said bar and driving means permitting an initial small motion of said bar out of its home position while said driving means is so held in its home position by said latch, and means providing a connection between said bar and said latch by which said bar is effective in said small initial motion thereof for operating said latch for releasing said driving means for so driving said bar.

2. The combination of claim 1 wherein there is included manually operated means for initially moving said bar for disengaging said latch, and means actuated by said power means at the end of a multiplication program for returning said bar to said home position.

3. In combination in a calculating machine, power means for operating said machine in cycles, an accumulator, means for entering digitation therein in the early part of the machine cycle, a multiplication-setting bar in said machine having a home position, manually actuatable means for moving said bar from said home position to an operated position, initial setting means operated by movement of said bar to said operated position for making initial sensing operations and settings for multiplication including digitation, a multiplication setting cam operable by said power means, settable means movable from a home position in one direction into position to the engaged by said cam and so moved into said position by the movement of said bar to said operated position, said movement of said bar into said operated position initiating cyclic operation of the machine including said cam, the initial motion of said cam moving said settable means in the same direction into a set position for completing the settings for multiplication, and holding means for holding said settable means in said set position.

4. The combination of claim 3 wherein said holding means also holds said bar in set position, and wherein there is included termination test means for releasing said holding means at the end of a multiplication operation, and means operable upon release of said holding means for restoring said bar to home position.

5. In combination in a multiplying calculating machine, power means for operating said machine in cycles, an accumulator, means for entering digitation therein in the early part of the machine cycle, a multiplication setting bar in said machine having a home position, manually actuatable means for moving said bar in a first direction out of said home position, initial setting means operable by said movement of said bar in said first direction for making initial sensing operations and settings for multiplication including digitation, a multiplication setting cam, settable means movable from a home position into a position to be engaged by said cam and so movable by motion of said bar as aforesaid in said first direction, said motion of said bar also initiating cyclic operation of said machine including said cam, the initial motion of said cam driving said settable means in the same direction to a set position for completing the settings for multiplication, means for holding said settable means in said set position, termination test means for releasing said holding means at the end of multiplication, and means operated by said power means upon the release of said holding means for driving said bar in a second direction opposite said first direction.

6. The combination of claim 5 wherein there is included, print-out control means settable by the movement of said bar in said second direction.

7. In combination in a multiplying calculating machine, power means for operating said machine in cycles, an accumulator, means for entering digitation therein in the early part of the machine cycle, a multiplication setting bar in said machine having a home position and movable in a first direction out of said home position to a first operated position, key-actuated means for so moving said bar, sensing control means moved by said motion of said bar in said first direction for causing the initial multiplier sensing operations, a multiplier clutch engaged by said motion of said bar, a multiplication setting cam, means moved by said motion of said bar into position to be engaged by said cam, said motion of said bar also initiating cyclic operation of the machine including said cam, the initial motion of said cam moving said bar in a second direction transverse said first direction to a second operated position for disengaging said sensing control means, termination control means operable at the completion of multiplication for moving said bar in a third direction opposite said second direction beyond said first operated position to a third operated position, print-out control means engageable by said bar when so moved in said third direction, means driven by said power means and operable when said bar is in engagement with said print-out control for driving said bar in a fourth direction opposite said first direction to an overstroke position, the motion of said bar in said fourth direction releasing said multiplier clutch and setting said print-out control, said bar during said last motion clearing said sensing control, and means for moving said bar in said first and second directions and returning it to its home position for disengaging said print-out control and aligning said bar with said sensing control for actuation thereof.

8. In combination in a calculating machine, power means for operating said machine in cycles, an accumulator, means for entering digitation therein in the early part of the machine cycle, a multiplication setting bar in said machine having a home position in which it is biased lightly rearward, spring-actuated means for pulling said bar forward, a first latch for said spring-actuated means connected to said bar, means providing a lost motion between said bar and said spring-actuated means permitting forward motion of said bar independent of said spring-actuated means for releasing said first latch, initial-setting means operated by the forward motion of said bar when pulled by said spring means for making initial sensing operations and settings for multiplication including digitation, a lever-setting cam, a lever moved by said forward motion of said bar into position to be engaged by said cam, said forward motion of said bar also initiating cyclic operation of said machine including said cam, the initial motion of said cam rocking said lever for completing the settings for multiplication, a second latch for holding said lever, termination test means for releasing said second latch at the end of a multiplication operation, power means operable upon the release of said lever by said second latch for driving said bar rearward to an overstroke position for tensioning said spring means and permitting said first latch to reset, and means for releasing said bar from said power means to permit it to move under force of said spring means from said overstroke position to its home position.

9. The combination of claim 8 wherein said initial setting means includes a sensing-control member pulled forward by said bar, wherein the cam-actuated rocking of said lever lifts said bar to disengage said member, and wherein said motion of said lever when released by said second latch lowers said bar.

10. The combination of claim 9 wherein there is included print-out control means which is engaged by said bar when it is lowered upon the release of said lever by said second latch, and wherein the power-driven rearward motion of said bar actuates said print-out control means for initiating a print-out operation of the machine.

References Cited by the Examiner

UNITED STATES PATENTS 2,215,263  9/40  Eichler.
3,005,585  10/61  Capellaro _____ 235—60 X LEO SMILOW, *Primary Examiner.*